(12) United States Patent
Bachelle

(10) Patent No.: US 8,899,001 B2
(45) Date of Patent: Dec. 2, 2014

(54) PROCESS AND MACHINE FOR OUTER PACKAGING OF ARTICLES

(75) Inventor: Romuald Bachelle, Yfiniac (FR)

(73) Assignee: Automatisation et Renovation du Conditionment dans les Industries Laitieres ARCIL, Puiseux Pontoise (FR)

( * ) Notice: Subject to any disclaimer, the term of this patent is extended or adjusted under 35 U.S.C. 154(b) by 992 days.

(21) Appl. No.: 12/976,311

(22) Filed: Dec. 22, 2010

(65) Prior Publication Data

US 2011/0192116 A1 Aug. 11, 2011

(30) Foreign Application Priority Data

Dec. 22, 2009 (FR) ..................................... 09 59440

(51) Int. Cl.
| | | |
|---|---|---|
| B65B 43/26 | (2006.01) | |
| B65G 47/91 | (2006.01) | |
| B65B 35/44 | (2006.01) | |
| B65B 11/10 | (2006.01) | |
| B65G 47/08 | (2006.01) | |
| B65B 35/50 | (2006.01) | |

(52) U.S. Cl.
CPC .............. *B65B 11/10* (2013.01); *B65G 47/918* (2013.01); *B65B 35/44* (2013.01); *B65G 47/084* (2013.01); *B65B 35/50* (2013.01)
USPC ..................... 53/398; 53/443; 53/520; 53/171

(58) Field of Classification Search
CPC ........ B65B 11/00; B65B 35/44; B65B 35/50; B65G 47/084; B65G 47/918
USPC ........... 53/398, 443, 447, 520, 171, 173, 174, 53/176
See application file for complete search history.

(56) References Cited

U.S. PATENT DOCUMENTS 3,416,675 A * 12/1968 Dardaine et al. ............ 198/418.4
3,835,979 A * 9/1974 Calvert et al. ................. 198/363
(Continued)

FOREIGN PATENT DOCUMENTS

| EP | 1112933 A1 | 7/2001 |
| EP | 1116676 A1 | 7/2001 |
(Continued)

OTHER PUBLICATIONS

French Search Report, dated Jul. 28, 2010, from corresponding French application.

*Primary Examiner* — Hemant M Desai

(74) *Attorney, Agent, or Firm* — Young & Thompson

(57) ABSTRACT

With a random incoming axial stream of pallets of articles, there is a stack of blanks, an axial stream synchronized with pallets is formed, all of the pallets are transferred from the axial stream synchronized with pallets to constitute an axial stream that is synchronized with lots, lots are separated by empty spaces having length of one or more article lengths, whereby the spacing is thus variable and adapted to lot length, blanks are unstacked upon demand based on the pallets to constitute a synchronized stream of blanks corresponding to the stream synchronized with lots. Blanks are separated by empty spaces with length of one or more article lengths, starting from the stream synchronized with lots and the stream synchronized with blanks; each lot of articles is made to work with each blank before the blank is folded around the lot of articles and made into a single unit.

29 Claims, 19 Drawing Sheets

(56) References Cited

U.S. PATENT DOCUMENTS

| | | | | |
|---|---|---|---|---|
| 4,571,923 | A | * | 2/1986 | Le Bras ........................ 53/398 |
| 5,148,654 | A | * | 9/1992 | Kisters ......................... 53/462 |
| 5,154,039 | A | * | 10/1992 | de Guglielmo ............... 53/398 |
| 5,592,804 | A | * | 1/1997 | Reuteler ....................... 53/398 |
| 5,626,002 | A | * | 5/1997 | Ford et al. .................... 53/398 |
| 5,673,536 | A | * | 10/1997 | Easter et al. .................. 53/398 |
| 6,044,627 | A | * | 4/2000 | de Guglielmo ............... 53/543 |
| 6,279,301 | B1 | * | 8/2001 | Corniani et al. .............. 53/458 |
| 2002/0043446 | A1 | | 4/2002 | Guglielmo et al. |
| 2003/0155266 | A1 | * | 8/2003 | Andersen et al. ............ 206/497 |
| 2005/0086910 | A1 | * | 4/2005 | Chambers et al. ............ 53/399 |
| 2005/0274091 | A1 | | 12/2005 | Bridier et al. |
| 2006/0207220 | A1 | * | 9/2006 | Ford ............................. 53/398 |
| 2010/0043355 | A1 | * | 2/2010 | Duperray et al. ............. 53/443 |
| 2010/0293891 | A1 | * | 11/2010 | Lamamy ....................... 53/167 |
| 2011/0154784 | A1 | * | 6/2011 | Poutot .......................... 53/443 |
| 2012/0233967 | A1 | * | 9/2012 | Bellante ........................ 53/443 |

FOREIGN PATENT DOCUMENTS

| | | |
|---|---|---|
| EP | 1530541 B | 5/2005 |
| EP | 1591364 A1 | 11/2005 |
| WO | 2007038311 A1 | 4/2007 |

* cited by examiner

PROCESS AND MACHINE FOR OUTER PACKAGING OF ARTICLES

BACKGROUND OF THE INVENTION

1. Field of the Invention

The invention relates to the outer packaging of articles so as to form outer-packaged lots of articles that each comprise a certain number of articles and an outer packaging that is made of cardboard (or the like) that surrounds the lot.

The invention applies quite especially to the case of fresh or ultra-fresh dairy products such as yogurts and the like, dessert creams, ice creams and the like, but also cheese products, compotes . . . . The invention also applies to products of different natures and/or destinations, but that can be considered to be analogous relative to their grouping in lots and their outer packaging.

2. Description of the Related Art

Such products are packaged in a primary packaging such as typically a carton made of plastic, waxed cardboard or the like designed to be closed by a lid. The term "carton" is to be broadly understood as comprising cartons, strictly speaking, but also baskets, cups, or any other form of analogous primary packaging. Conventionally, a primary packaging filled with its contents is called "article." These articles (or primary packagings filled with their contents) are arranged on individualized pallets that comprise several articles side by side and attached to one another by being arranged in columns and/or lines with lines or fragile zones with lower strength between them. For example, a pallet comprises two cartons or four cartons that are arranged in two rows that each comprise two cartons or else six cartons in two rows that each comprise three cartons . . . . The primary packagings are arranged to form a group—or pack—comprising a single pallet of cartons or multiple pallets of superposed cartons that are surrounded by a secondary outer packaging for grouping and holding, in such a way that the unit forms a whole that can be manipulated, transported and stored by the consumer. Such an outer packaging is typically made of flat cardboard or a material that includes cardboard, starting from a blank that is cut out to have a suitable shape, which is then arranged around the pallet(s), and then folded and finally closed on itself.

For the production of such outer-packaged packs of articles, the contents to be packaged are arranged or manufactured, the primary packagings (cartons and lids) that are arranged on pallets are arranged or manufactured, and the individualized outer-packaging blanks are arranged or manufactured. Then, the articles themselves are produced, i.e., the primary packagings of each pallet are filled with the desired content(s), and then the primary packagings of each pallet are closed by installation of the lids. Then, the lots or packs are formed, and if they comprise multiple pallets, their grouping, for example superposition, is ensured. Then, around each lot or pack, an outer-packaging blank is arranged that is folded and that is closed on itself. A portion of these operations is carried out in outer-packaging machines.

Such an outer-packaging machine comprises an intake of articles on pallets, an intake of blanks, and a discharge of lots or packs comprising the articles and the outer packaging.

The purpose of the document EP-A-1116676 is an outer-packaging machine that comprises a conveyor that can accommodate successive groups of articles to direct them from an upstream location to a downstream location; one path of travel along which the articles are directed one by one toward said conveyor by being juxtaposed with one another; means for transferring the articles from the path of travel to the conveyor, able to grasp and group the articles for forming spaced packs; and a transporter that can, on the one hand, direct cardboard blanks, placed essentially flat on the transporter, one by one toward said conveyor, and arranging the blanks on the conveyor opposite the packs of articles; driving means and transfer means; and finally a device for command and control of driving means, able to apply to each driving means a speed profile that is selected from among a preprogrammed set of speed profiles for making it possible to regulate the spacing and/or the number of articles per pack based on the desired spacing and/or the type of pack.

The document EP-A-1112933 describes, within the framework of a machine such as the one described above, a system for conveying objects that comprises at least one endless conveyor that can direct the objects along a transport surface, whereby the conveyor comprises a number of uniformly spaced pushers, attached to a movable support of pushers, circulating continuously, in a single direction and periodically along a path in a closed loop that extends essentially in a conveying plane, perpendicular to the transport surface, whereby the trajectory is locally contiguous to the transport surface, in which each pusher is mounted to move between a so-called inactive position where the pusher is located at a distance from the transport surface and does not project from the latter, and a so-called active position where it projects at least partially from the transport surface to engage with an object and to push the latter along the transport surface, such that it is possible to vary the number of pushers simultaneously in active position and in this way to vary the distance between two active pushers.

The prior art also comprises the documents U.S. Pat. No. 3,416,675, EP 1530 541, US 2005/274091, WO 2007/038311, EP-A-1530541 and EP-A-1591364.

With the known outer-packaging machines with manipulators that are robotized and of the constant-spacing type in which the spacing is combined with the length of the packs or lots to be produced, the linear speed of the machine is to be adapted to the stream of pallets of articles that enter the machine. The smaller the number of articles per pack, the higher the linear speed of the machine. Significant accelerations or decelerations follow that inevitably affect the quality of operation of the machine and the lots or packs that are produced. The machine is to be adapted to the incoming stream, whereas the intake paths are not synchronized, such that to be certain that all of the incoming articles are taken by the manipulators, it is necessary to provide an adequate—high—number of such manipulators. In addition, it is necessary to anticipate the unstacking of the blanks requiring the transfer of blanks where there is an empty space on the conveyor of the articles. Also, it is necessary to begin the transport of the blanks at the beginning of production. In addition, the storage unit of blanks is located outside of the machine itself, and the unstacking of blanks is done upstream from the robotized zone. With such a machine, the spacing is fixed, and it is not possible to adapt the speed of the machine based on the formats.

BRIEF SUMMARY OF THE INVENTION

The problem on which the invention is based is to propose a process and an outer-packaging machine with robotized manipulators that do not have a constant spacing but rather a variable spacing and that make it easy to have multiple format variations.

For this purpose, and according to a first aspect, the invention has as its object a process for outer packaging, in an outer-packaging blank, of articles that are arranged on pallets, each comprising a number of articles of the same length in the direction of travel, arranged in one or more columns and/or one or more lines, to form lots of articles that are arranged on one or more layers of pallets and comprising a peripheral outer packaging in which, in a dynamic way:

There is a random incoming axial stream of pallets of articles, and lots of articles are composed, There is a stack of outer-packaging blanks arranged flat, and the blanks are successively unstacked, Each lot of articles put together with each unstacked flat blank is made to cooperate successively, and then the blank is folded around the lot of articles and is made into a single unit, The axial stream that exits from the outer-packaged lots of articles is evacuated, The outer-packaged lots of articles comprising a number of articles per pallet, an arrangement of articles on each pallet, and a variable number of stacked pallets based on the format of the desired lots.

According to one characteristic of this process:

The pallets of articles of the incoming axial stream are regulated and synchronized to the spacing of the machine to form an axial stream that is synchronized with the pallets of articles, All of the pallets of articles are transferred from the axial stream that is synchronized with the pallets of articles to constitute an axial stream that is synchronized with lots of articles according to the desired format and operating rate, Each lot of articles of the axial stream that is synchronized with lots of articles is thus separated axially from the preceding lot of articles and/or the following lot of articles by an empty axial space that has the axial length of an article or a multiple of the axial length of an article, whereby the axial spacing of the machine is thus variable and adapted to the axial length of the lot of articles, Then, the flat blanks are unstacked upon demand based on the pallets of articles that are thus transferred for constituting an axial stream that is synchronized with flat blanks corresponding exactly to the axial stream that is synchronized with the lots of articles, Each blank of the axial stream that is synchronized with flat blanks is thus separated from the preceding blank and/or the following blank by an empty axial space that has the axial length of an article or a multiple of the axial length of an article, Starting from the axial stream that is synchronized with lots of articles and with the axial stream that is synchronized with flat blanks, each lot of articles is made to cooperate successively with each flat blank before the blank is folded around the lot of articles and is made into a single unit.

According to one embodiment, before making each lot of articles of the axial stream that is synchronized with lots of articles cooperate with each flat blank of the axial stream that is synchronized with flat blanks, a fine and final axial resetting of the synchronization of the pallets of articles of the axial stream that is synchronized with pallets of articles is ensured.

According to one embodiment, all of the pallets of articles are transferred from the synchronized stream of pallets of articles to constitute an axial stream that is synchronized with lots of articles, according to the desired format and operating rate, by a manipulation of robotized grasping.

According to one embodiment, all of the pallets of articles are transferred from the axial stream that is synchronized with pallets of articles to constitute an axial stream that is synchronized with lots of articles, according to the desired format and operating rate, by a manipulation of the grasping of a single pallet at the same time or of multiple pallets simultaneously.

According to one embodiment of the process:

Each spacing of the axial stream that is synchronized with lots of articles is controlled, If the spacing comprises a lot of articles, the unstacking of a flat blank is controlled, If the spacing does not comprise a lot of articles, the unstacking of a flat blank is not controlled, And the axial stream that is synchronized with lots of articles and the axial stream that is synchronized with flat blanks are made to cooperate in such a way that a spacing that comprises a lot of articles corresponds to a spacing that comprises a flat blank, and a spacing that does not comprise a lot of articles corresponds to a spacing that does not comprise a flat blank.

According to one embodiment for constituting an axial stream that is synchronized with flat blanks in which each blank of the stream is separated from the preceding blank and/or the following blank by an empty axial space that has the axial length of an article or a multiple of the axial length of an article, each flat blank of the axial stream that is synchronized with flat blanks is pushed by means of driving pusher pins that have uniform axial spacing and that are arranged to be either in an active projecting situation or in an inactive retracted situation; the successive pusher pins are guided and directed so that they are in the active projecting situation or in the inactive retracted situation corresponding to the configuration that is required for driving the successive flat blanks of the axial stream that is synchronized with the flat blanks in correspondence with the axial stream that is synchronized with lots of articles.

According to one embodiment, in a mode regulating the spacing of the axial stream that is synchronized with flat blanks, the procedure is as follows:

In an inactive routing segment for returning pusher pins where the pusher pins do not provide any push function of the flat blanks, the successive pusher pins are directed to bring them into the active projecting situation or into the inactive retracted situation in such a way as to define a configuration of successive pusher pins corresponding to the required configuration for driving the successive flat blanks of the axial stream that is synchronized with flat blanks in correspondence with the axial stream that is synchronized with lots of articles, Once the thus directed pins are brought into the active projecting situation or into the inactive retracted situation that is required, the pusher pins are guided in movement by maintaining their active projection situation or inactive retracted situation, including in an active routing segment for intake of pusher pins where the pusher pins provide their push function of the flat blanks.

According to one embodiment, in a production method without regulating the spacing of the axial stream that is synchronized with flat blanks, the procedure is as follows: the pusher pins are guided in movement by maintaining their active projecting situation or their inactive retracted situation corresponding to the required configuration to drive the successive flat blanks of the axial stream that is synchronized with flat blanks in correspondence with the axial stream that is synchronized with lots of articles, in an inactive routing segment for returning pusher pins where the pusher pins do not provide any push function of the flat blanks and in an active routing segment for intake of pusher pins where the pusher pins provide their push function of the flat blanks.

According to a second aspect, the invention has as its object a machine for outer packaging, in an outer-packaging blank, of articles arranged on pallets, each comprising a number of articles of the same length in the direction of travel, arranged in one or more columns and/or one or more lines, to form lots of articles that are arranged on one or more layers of pallets and comprising a peripheral outer packaging for the implementation of the process that has just been described.

Such a machine comprises:

Upstream, axial intake means of an incoming random axial stream of pallets of articles and means for constituting lots of articles, Upstream, means for forming a stack of flat, outer-packaging blanks and means for unstacking blanks successively, Downstream, means for constituting lots of articles and means for unstacking blanks, means of cooperation of each lot of articles constituted with each unstacked flat blank, and, downstream, means for folding the blank around the lot of articles and for making it into a single unit, Downstream, means for axial evacuation of the axial stream that exits from the outer-packaged lots of articles.

According to a characteristic of such a machine, it comprises:

Upstream, means for regulating and means for synchronizing the pallets of articles of the incoming stream to the spacing of the machine, followed by axial conveying means of an axial stream that is synchronized with pallets of articles, Means for transferring all of the pallets of articles from the axial conveyor means of the axial stream that is synchronized with the pallets of articles to the axial conveyor means of an axial stream that is synchronized with lots of articles according to the desired format and operating rate, Means for unstacking flat blanks upon demand that are responsive to the means for transferring pallets of articles, followed by axial conveyor means of an axial stream that is synchronized with flat blanks in correspondence with the axial conveyor means of the axial stream that is synchronized with lots of articles, Downstream, axial conveyor means of the axial stream that is synchronized with lots of articles and axial conveyor means of the axial stream that is synchronized with flat blanks, means for cooperation successively from each lot of articles with each flat blank, and, downstream, means for folding the blank around the lot of articles and for making it into a single unit.

According to one embodiment, the axial conveyor means of an axial stream that is synchronized with lots of articles comprise projections for positioning and maintaining uniform axial spacing so that a lot of articles of the stream that is synchronized with lots of articles is positively maintained separated from the preceding lot of articles and/or the following lot of articles by an empty axial space that has at least the axial length of an article or that has the axial length of a multiple of the axial length of an article, the axial spacing of the machine thus being variable and adapted to the length of the lot of articles, and the axial conveyor means of an axial stream that is synchronized with lots of articles being adapted to the conveying of lots of articles with a variable axial length, without the need for regulation.

According to one embodiment, the axial conveyor means of an axial stream that is synchronized with lots of articles can be regulated in terms of transverse spacing, with the axial conveyor means of an axial stream that is synchronized with lots of articles being adapted to the conveying of lots of articles of variable transverse length.

According to one embodiment, the axial conveyor means of an axial stream that is synchronized with flat blanks comprise pusher pins for positioning and maintaining uniform axial spacing that is retractable so that a flat blank of the stream that is synchronized with a flat blank is positively maintained separated from the preceding flat blank and/or the following flat blank by an empty axial space that has at least the axial length of an article or that has the axial length of a multiple of the axial length of an article, whereby the axial spacing of the machine thus is variable and adapted to the length of the lot of articles, with the axial conveyor means of an axial stream that is synchronized with blanks being adapted to the conveying of blanks of variable axial length, without the need for regulation.

According to one embodiment, the axial conveyor means of an axial stream that is synchronized with flat blanks can be regulated in terms of transverse spacing, whereby the axial conveyor means of an axial stream that is synchronized with flat blanks is adapted to the conveying of flat blanks of variable transverse length.

According to one embodiment, upstream from the means of cooperation of each lot of articles of the axial stream that is synchronized with lots of articles with each flat blank of the axial stream that is synchronized with flat blanks, the outer-packaging machine comprises means for fine and final resetting of the synchronization of the pallets of articles of the axial stream that is synchronized with pallets of articles.

According to one embodiment, the means for transferring all of the pallets of articles from the axial conveyor means of the axial stream that is synchronized with pallets of articles to the axial conveyor means of an axial stream that is synchronized with lots of articles, according to the desired format and operating rate, comprise one or multiple robots for manipulation of grasping.

According to one embodiment, the means for transferring all of the pallets of articles from the axial conveyor means of the axial stream that is synchronized with pallets of articles to the axial conveyor means of an axial stream that is synchronized with lots of articles, according to the desired format and operating rate, comprise means for manipulating the grasping of a single pallet at the same time or multiple pallets simultaneously.

According to one embodiment, the outer-packaging machine comprises means for controlling each spacing of the axial conveyor means of the axial stream that is synchronized with lots of articles for detecting the presence or the absence of a lot of articles and means for control of the unstacking means that are responsive to these control means.

According to one embodiment, the means for regulation and the means for synchronization to the spacing of the machine of the pallets of articles of the incoming stream comprise the upstream portion of the axial conveyor means of an axial stream that is synchronized with pallets of articles with which are combined retractable locking elements downstream from the pallets of articles that move axially at a lower speed than that of the axial conveyor means of an axial stream that is synchronized with pallets of articles.

According to one embodiment, the downstream portion of the axial conveyor means of the axial stream that is synchronized with pallets of articles has an adequate length such that all of the pallets that they receive can be transferred by the transfer means to the axial conveyor means of an axial stream that is synchronized with lots of articles.

According to one embodiment, the axial conveyor means of the axial stream that is synchronized with pallets of articles and axial conveyor means of the axial stream that is synchronized with lots of articles are arranged side by side.

According to one embodiment, the axial conveyor means of the axial stream that is synchronized with pallets of articles have a transverse width that can accommodate multiple pallets of articles.

According to one embodiment, the axial conveyor means of the axial stream that is synchronized with lots of articles have a transverse width that can accommodate a single pallet of articles.

According to one embodiment, the axial conveyor means of an axial stream that is synchronized with lots of articles come in the form of two endless belts that are arranged parallel to one another and that form a conveying corridor, supporting projections for positioning and maintaining uniform axial spacing, arranged to be directed toward the corridor, whereby the two belts are carried by carrying means in a movable manner with locking to be able to be regulated in terms of transverse spacing.

According to one embodiment, the axial conveyor means of an axial stream that is synchronized with flat blanks come in the form of two endless driving belts, arranged parallel to one another, forming a conveying corridor, supporting pusher pins for positioning and driving that are uniformly spaced axially, arranged to move and that can be locked in position in such a way as to each be separately in an active projecting situation or in an inactive refracted situation, and comprise means for guiding and means for directing successive pusher pins that are capable in that they are in the active projecting situation or in the inactive retracted situation corresponding to the configuration that is required for driving the successive flat blanks of the axial stream that is synchronized with flat blanks in correspondence with the axial stream that is synchronized with lots of articles.

According to one embodiment, the axial conveyor means of an axial stream that is synchronized with flat blanks comprise an active routing segment for intake of pusher pins where the pusher pins provide their push function of flat blanks and an inactive routing segment for returning pusher pins where the pusher pins do not provide any push function of the flat blanks, segment on which there are the means for guiding and the means for directing the pusher pins.

According to one embodiment, a pusher pin is carried by an axial driving part that is carried by an endless belt, whereby the axial driving part is able to work with axial sliding with an axial guiding slide, the pusher pin being mounted on the axial driving part in an articulated way around a transverse axis to be able to pivot in a relative way over a course that has two end-of-travel positions defining the two active projecting and inactive retracted situations, whereby the pusher pin laterally comprises a control stud that is directed transversally and that is separated from the pivoting axis, working with one of the two axial guiding slides of the stud, arranged parallel to one another and to the axial guiding slide of the driving part, whereby the stud is in one of the two axial guiding slides of the stud in the active projecting situation and is in the other of the two axial guiding slides of the stud in the inactive retracted situation.

According to one embodiment, the directing means comprise a guiding bypass that connects the two axial guiding slides of the stud and a controlled movable orientation part that can control the guiding of the stud so that it remains in the axial guiding slide of the stud where it was found or so that it is oriented toward the other axial guiding slides of the stud.

According to one embodiment, the axial conveyor means of an axial stream that is synchronized with flat blanks can be regulated in terms of transverse spacing.

BRIEF DESCRIPTION OF THE DRAWINGS

Several embodiments of the invention will now be described using drawings, in which.

DETAILED DESCRIPTION OF THE PREFERRED EMBODIMENTS

Figure 1:
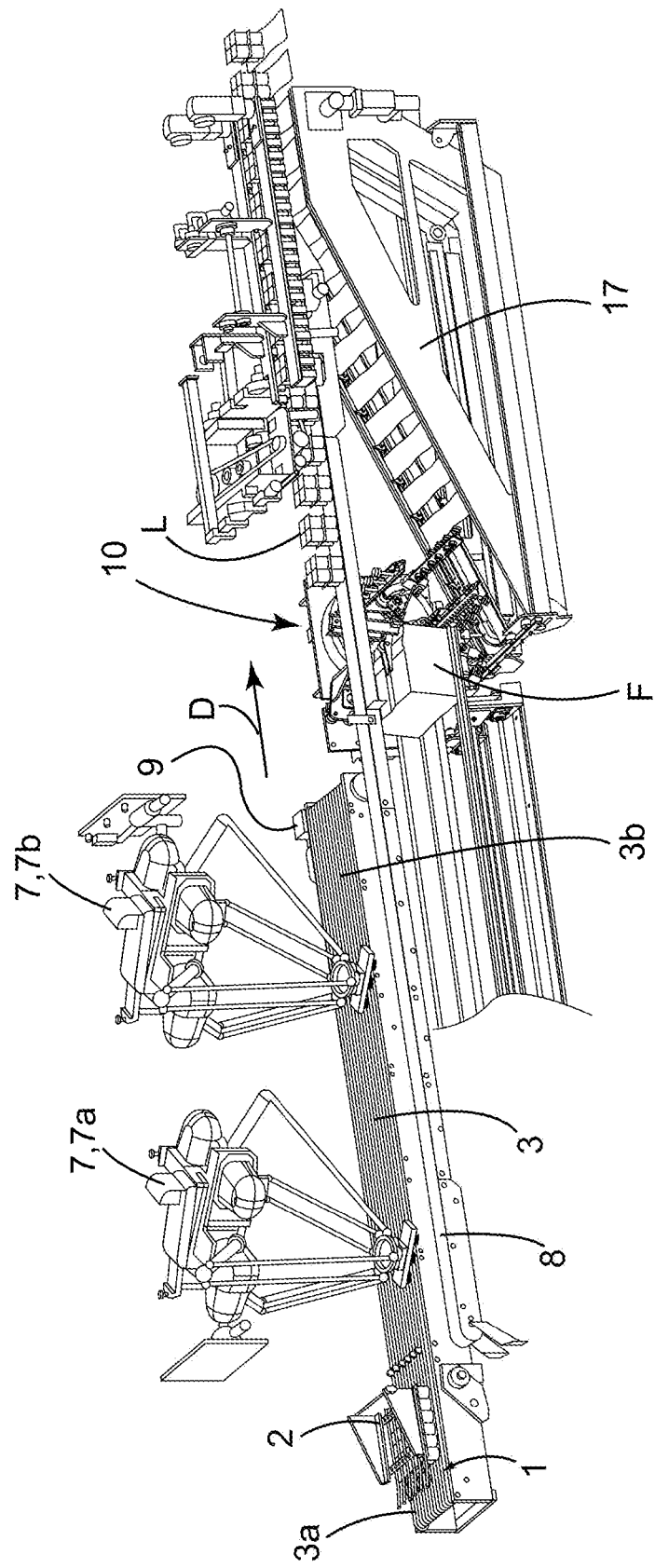
FIG. 1 is a partial general perspective view of an outer-packaging machine according to the invention, on which there are pallets of articles, lots of articles, and flat blanks.

The invention relates to the outer packaging, in an outer-packaging blank F, of articles A that are arranged on pallets P each comprising a number of articles A of the same length in a direction D, which is a general direction of travel, termed axial. For a given pallet P, the articles A are arranged in one or multiple columns and/or one or multiple lines. The purpose of the process and the outer-packaging machine according to the invention is to form lots L of articles arranged in one or more layers of pallets P and also comprising a peripheral outer packaging that is formed by the folded blank F and made into a single unit.

The articles A are typically primary outer packagings such as cartons made of plastic, waxed cardboard, or the like, designed to be closed by lids and containing fresh or ultra-fresh dairy products such as yogurts and the like, dessert creams, ice creams and the like, but also cheese products, compotes . . . . All of this is only by way of example and is nonlimiting, and the term "article" conventionally means a primary packaging that is filled with its contents.

As indicated above, a pallet P can comprise, for example, two cartons or four cartons arranged in two rows that each comprise two cartons or else six cartons in two rows that each comprise three cartons . . . all of this being given only by way of example and non-limiting.

The outer packaging is typically produced from a blank F made of flat cardboard or a material that includes cardboard, cut to have a suitable shape.

In a typical embodiment, the articles A have a general shape that is cylindrical or prismatic or pseudo-cylindrical or pseudo-prismatic or egg-shaped or the like with an axis that is normally arranged vertically. In a typical embodiment, such an article A has an axial length on the order of several centimeters.

In the description, it is understood that the expression "pallet P" means a pallet P of articles A that are arranged in columns and lines and that the expression "lot L" means a lot L of articles.

The process can be implemented and the machine can operate provided that pallets P and stacked flat blanks F are available. These pallets P and these blanks F are processed separately. In particular, the process according to the invention can be implemented, and the machine according to the invention can be installed downstream, in particular immediately downstream or almost immediately downstream, from a line or a unit for processing of the articles A (formation of the content, filling and closing).

Thus, an incoming random axial stream from the pallets P is available.

According to the process, lots L of articles are composed, the blanks are successively unstacked, each lot L that is composed is made to cooperate successively with each unstacked flat blank F, and then the blank F is folded around the lot L, and it is made into a single unit. Then, the outer-packaged lots of articles are evacuated.

The outer-packaged lots of articles comprise a number of articles A per pallet, an arrangement of the articles A on each pallet P, and a number of stacked pallets P that is variable based on the format of the desired outer-packaged lots of articles.

The purpose of the process and the machine according to the invention is that the change in format can take place easily, quickly, and reliably.

The machine comprises a suitable frame and suitable support elements.

It extends horizontally along a general direction D that is also the direction of the driving movement of the driving parts and elements with which the machine is provided, such as conveyors or conveyor means. This direction D is also that of the streams: pallets P, blanks F, and lots L. The direction d is described as axial. The conveyors, the conveyor means, the streams (pallets P, blanks F, and lots L) can therefore thus be described. The conveyors or conveyor means and the streams are in motion along the axial direction D in a given direction, which makes it possible to define, on the machine, an upstream side (left side in the figures) and a downstream side (right side in the figures). Furthermore, "transverse" is described as a horizontal direction that is perpendicular to the axial direction D.

Upstream, the machine comprises means 1 for intake of an incoming random stream of pallets P, such as a conveyor belt. These means 1 are arranged at the outlet or close to the outlet of a line or a unit for processing of the articles A.

Immediately downstream from the means 1, but consequently on the general upstream side of the machine, the machine comprises means 2 for regulation and synchronization to the spacing of the machine of the pallets P of the incoming stream.

These means 2 are followed by conveyor means 3 of a synchronized stream of pallets P.

Figure 3:
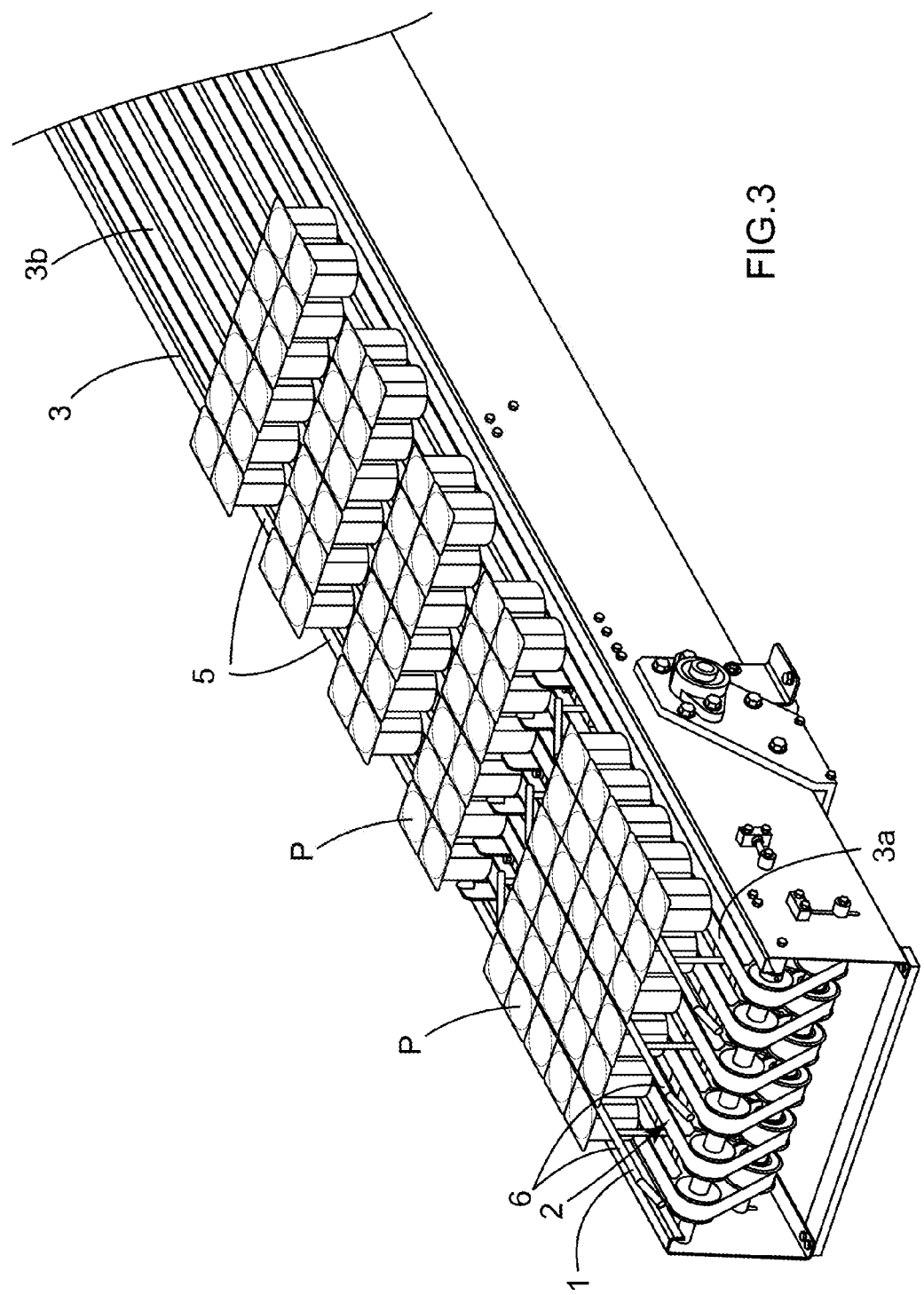
FIG. 3 is a view that is analogous to FIG. 2, on a smaller scale, whereby the machine is equipped with articles.

In the embodiment that is shown, the means 2 for regulation and synchronization comprise the upstream portion 3a of the conveyor means 3 with which are combined retractable elements 4 for downstream locking of the pallets P. These elements are mounted to move axially, and they move at a lower speed than that of the conveyor means 3. Thus, the elements 4 ensure both the accumulation of the pallets P upstream from the conveyor means 3, and when they are refracted at the downstream end of their travel, they release the pallets P that are then driven by the conveyor means 3. By so doing, an empty space 5 (FIG. 3) is created between two successive pallets P that were adjacent in the accumulation portion.

This empty space 5 corresponds—aside from operational play—to the axial length of an article A.

In the embodiment shown, the conveyor means 3 allow the intake of multiple pallets P from the front.

Figure 2:
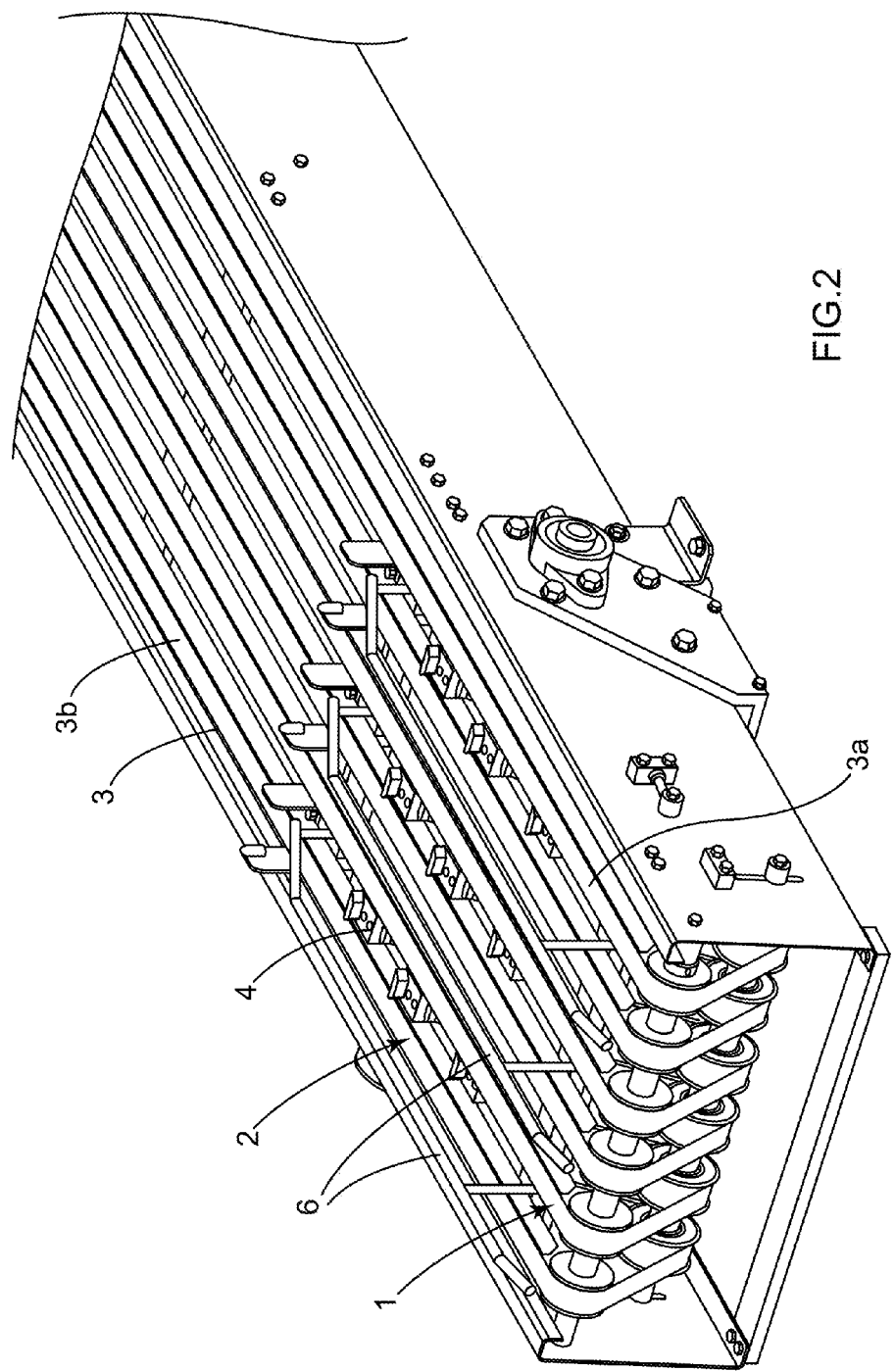
FIG. 2 is a detail view in partial perspective of the upstream portion of the machine, without an article, illustrating its regulating means and its means for synchronization to the spacing of the machine of pallets of articles of the incoming stream and its axial conveyor means of an axial stream that is synchronized with pallets of articles.

Guide rails 6, or the like, ensure the exact alignment of the pallets P relative to the conveyor means 3 (FIG. 2).

Figure 4:
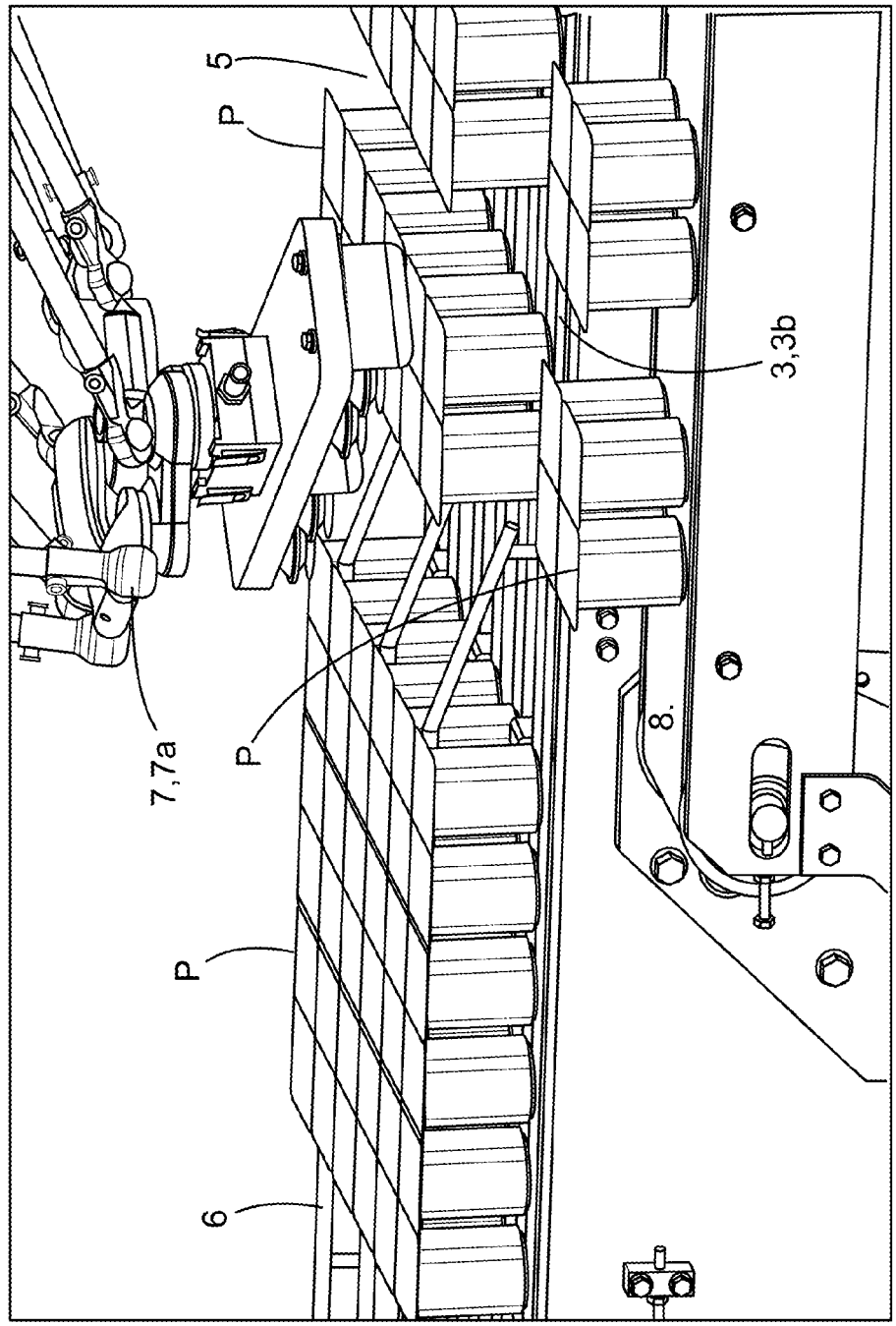
FIG. 4 is a detail view in partial perspective of the upstream portion of the machine, with articles, illustrating in one operating stage its means for transferring pallets of articles from its axial conveyor means of the axial stream that is synchronized with pallets of articles toward its axial conveyor means of an axial stream that is synchronized with lots of articles.
Figure 5:
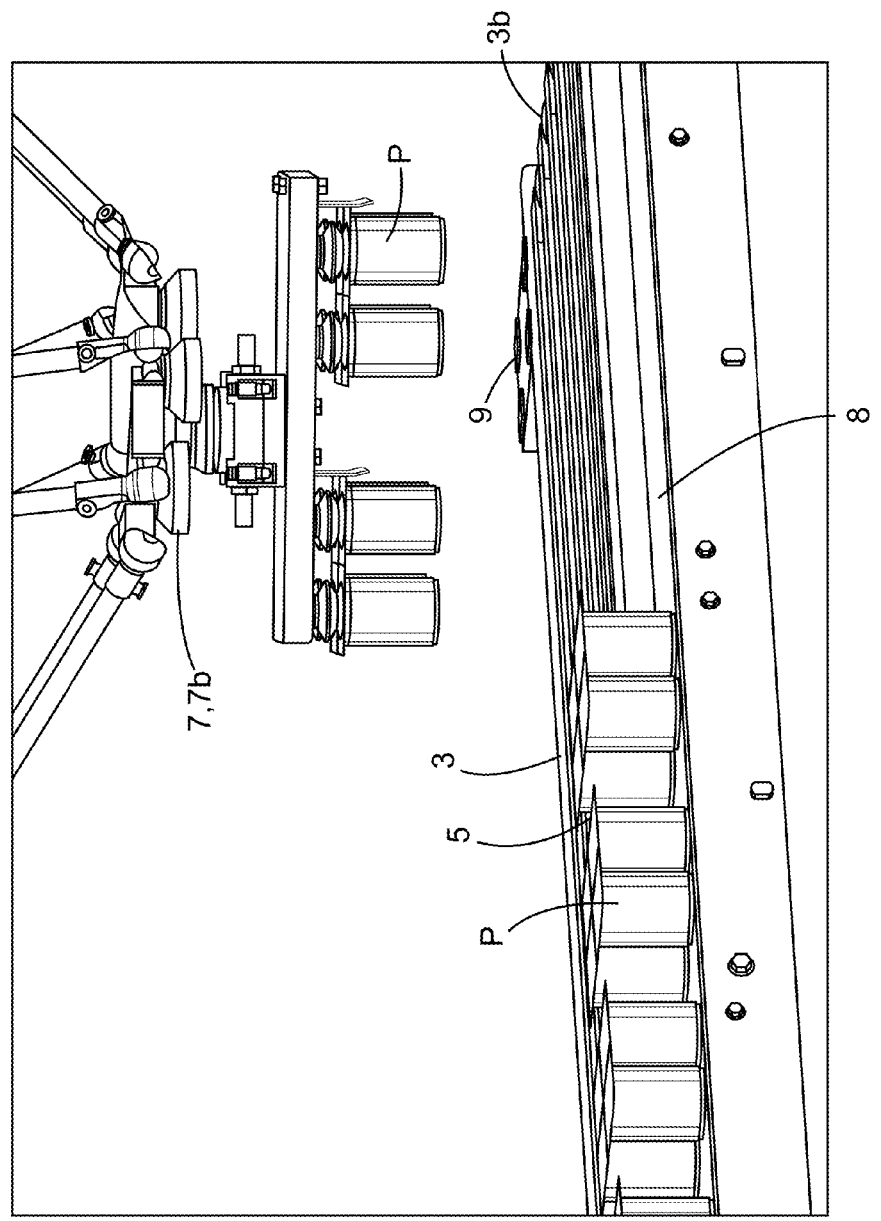
FIG. 5 is a view that is analogous to FIG. 4, under another angle of view, in a subsequent operating stage.
Figure 6:
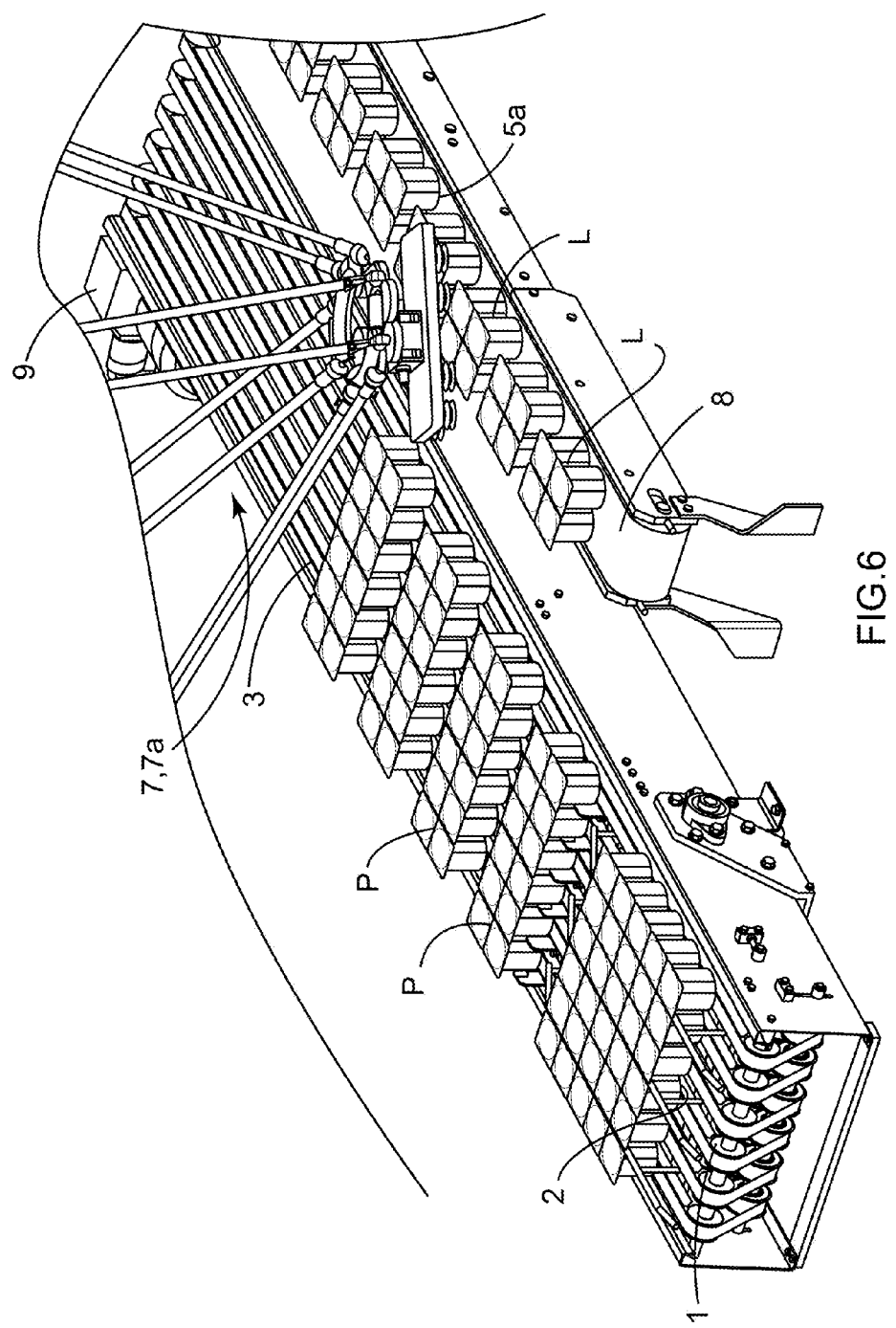
FIG. 6 is a view that is analogous to FIGS. 4 and 5, on a smaller scale and under another angle of view, in a subsequent operating stage.

The downstream portion 3b of the conveyor means 3 is of greater length than the upstream portion 3a, and this length is such that all of the pallets P that are on this downstream portion 3b can be grasped by one of the robots 7, 7a, 7b for manipulation of grasping of the pallets P to transfer them from the conveyor means 3 to and on conveyor means 8 of a stream that is synchronized with the lots L, the articles A, at this time being lacking in outer packaging F. Thus, the robots 7, 7a, 7b in this case constitute means for transferring all of the pallets P from the conveyor means 3 to and on the conveyor means 8 (FIGS. 4, 5 and 6).

In general, multiple robots for manipulation of grasping 7, 7a, 7b are provided and are arranged along, above and perpendicular to the downstream portion 3b of the conveyor means 3, in such a way that all of the pallets P are ultimately grasped by the robots 7, 7a, 7b.

The operation of the robots 7, 7a, 7b is controlled starting from control means 9 based on pallets P entering the machine and the lots L to be produced. Means for detecting pallets, display means, . . . can be combined with them.

Using the arrangement of the machine, it is possible to avoid being obligated to supply the machine with an excess number of robots 7 for safety reasons (grasping of all of the pallets P), and it is provided that at the downstream end 3c of the conveyor means 3, there are no longer pallets P that have not been grasped and transferred by one of the robots.

As is shown in FIG. 5, a robot for manipulation of grasping 7, 7a, 7b is arranged with a top that makes it possible simultaneously to grasp several pallets P simultaneously and in a consequently controlled manner. As a variant, the top of the robot 7, 7a, 7b grasps only one pallet P at a time. According to the formats of the desired lots L, the robots 7, 7a, 7b may or may not arrange several layers of pallets P on one another.

The conveyor means 3 and the conveyor means 8 are, for example, conveyor belts that are arranged side by side. Whereas the conveyor means 3 can have a transverse width that can accommodate multiple pallets P from the front, the transverse width of the conveyor means 8 is suitable for accommodating a single pallet P from the front, keeping in mind that a pallet P can comprise a variable number of lines and columns of articles A (FIGS. 4 and 6).

Finally, a stream that is synchronized with lots L (without outer packaging F, of course) was thus composed on the conveyor means 8. These lots L follow one another, and two successive lots L are separated by an empty space 5a that, like the empty space 5, corresponds—aside from operational play—to the axial length of an article A.

Consequently, the machine makes it possible to implement a process in which the pallets P are regulated and synchronized to the spacing of the machine to form an axial stream that is synchronized with the pallets P, and then all of the pallets P are transferred from the axial stream that is synchronized with pallets P to compose an axial stream that is synchronized with lots L of articles, according to the desired format and operating rate.

It is possible, nevertheless, that a spacing (axial length corresponding to the space requirement of a lot +an empty space) is lacking a lot L. The machine consequently comprises means for controlling each spacing of the conveyor means 8 to detect the presence or the absence of a lot L. These control means are operationally coupled to control means of means 10 for unstacking blanks F, and they are responsive to these control means.

The lots L that are conveyed by the conveyor means 8 are designed to be combined with a flat blank F that will then be folded and made into a single unit.

Figure 7:
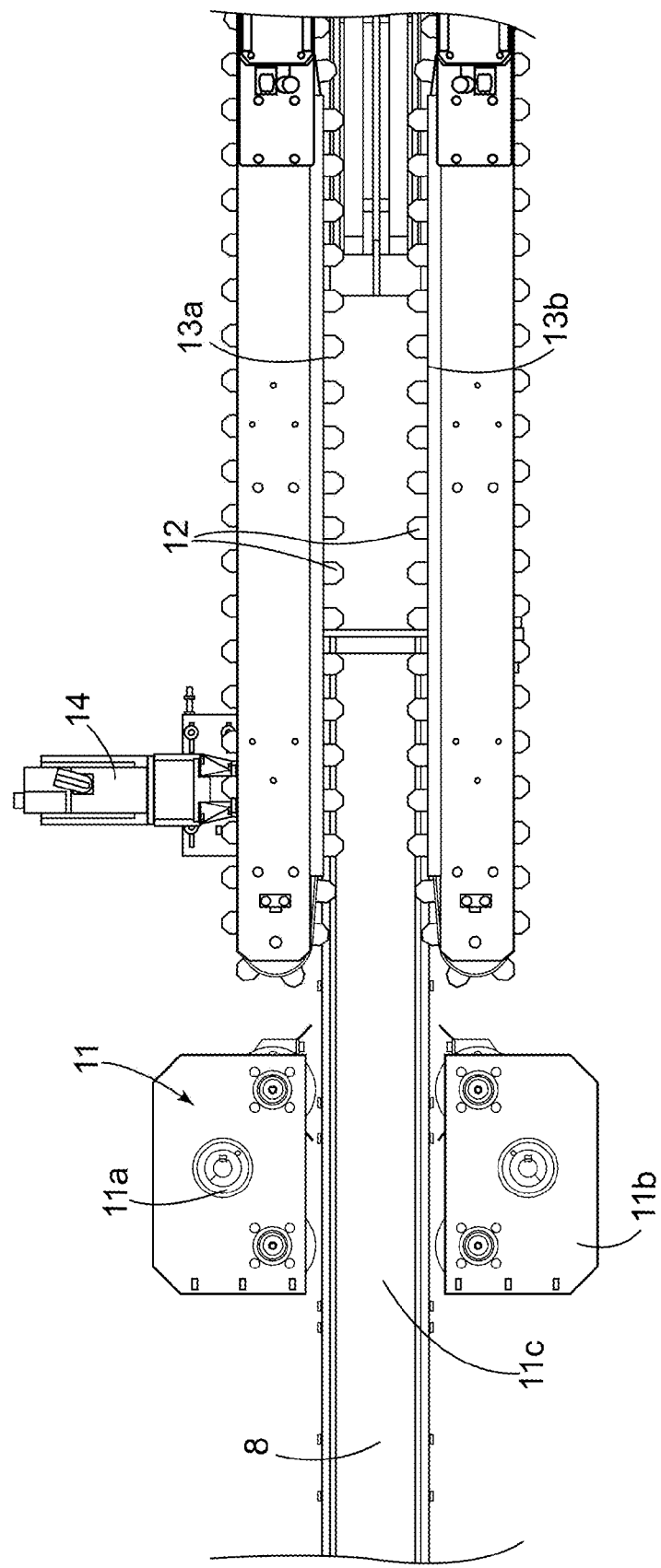
FIG. 7 is a partial top view of the median portion of the machine, without an article, without a lot of articles, and without a blank, illustrating its axial conveyor means of an axial stream that is synchronized with lots of articles and its fine and final resetting means of the synchronization of plates of articles of the axial stream that is synchronized with pallets of articles.
Figure 8:
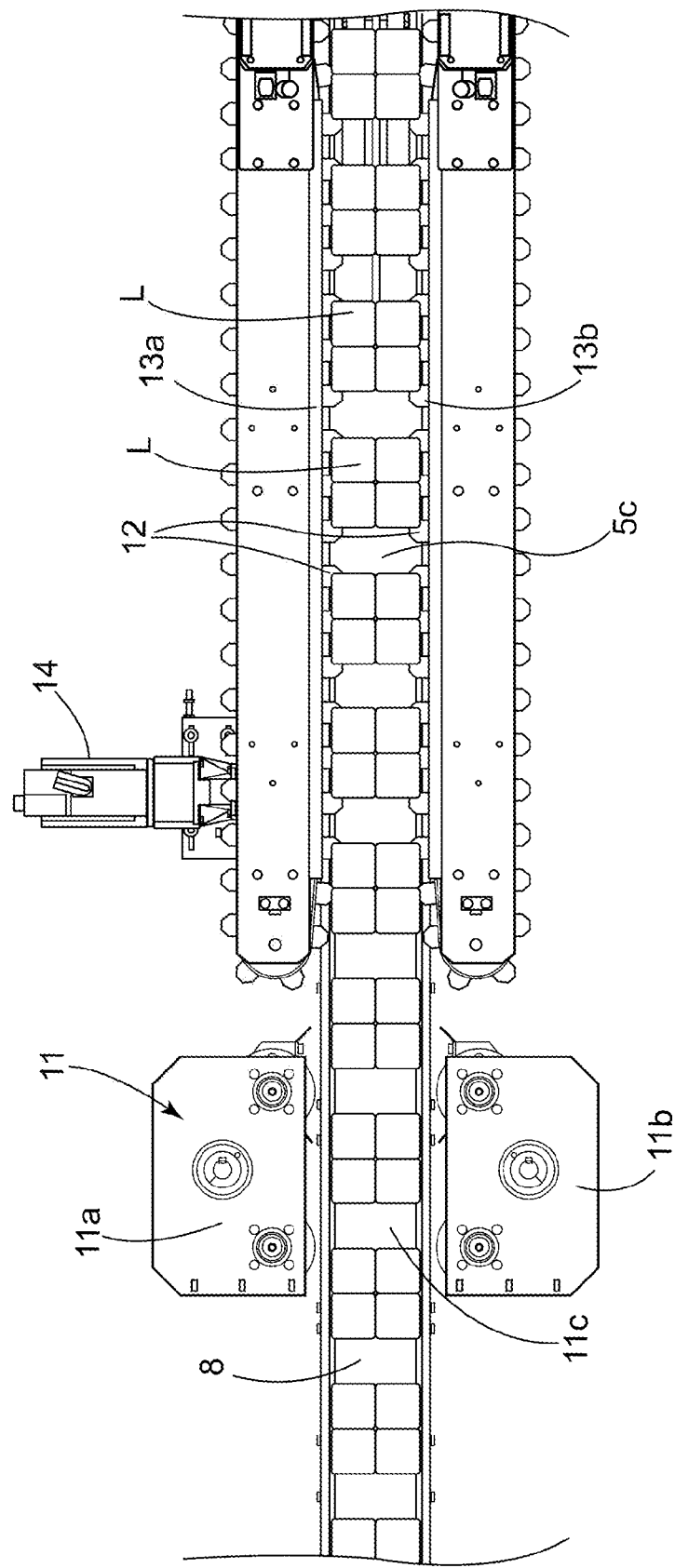
FIG. 8 is a view that is analogous to FIG. 7, whereby the machine is equipped with lots of articles comprising four articles that are arranged 2×2, each lot of articles being separated from adjacent lots by an empty space that has the axial length of an article.
Figure 9:
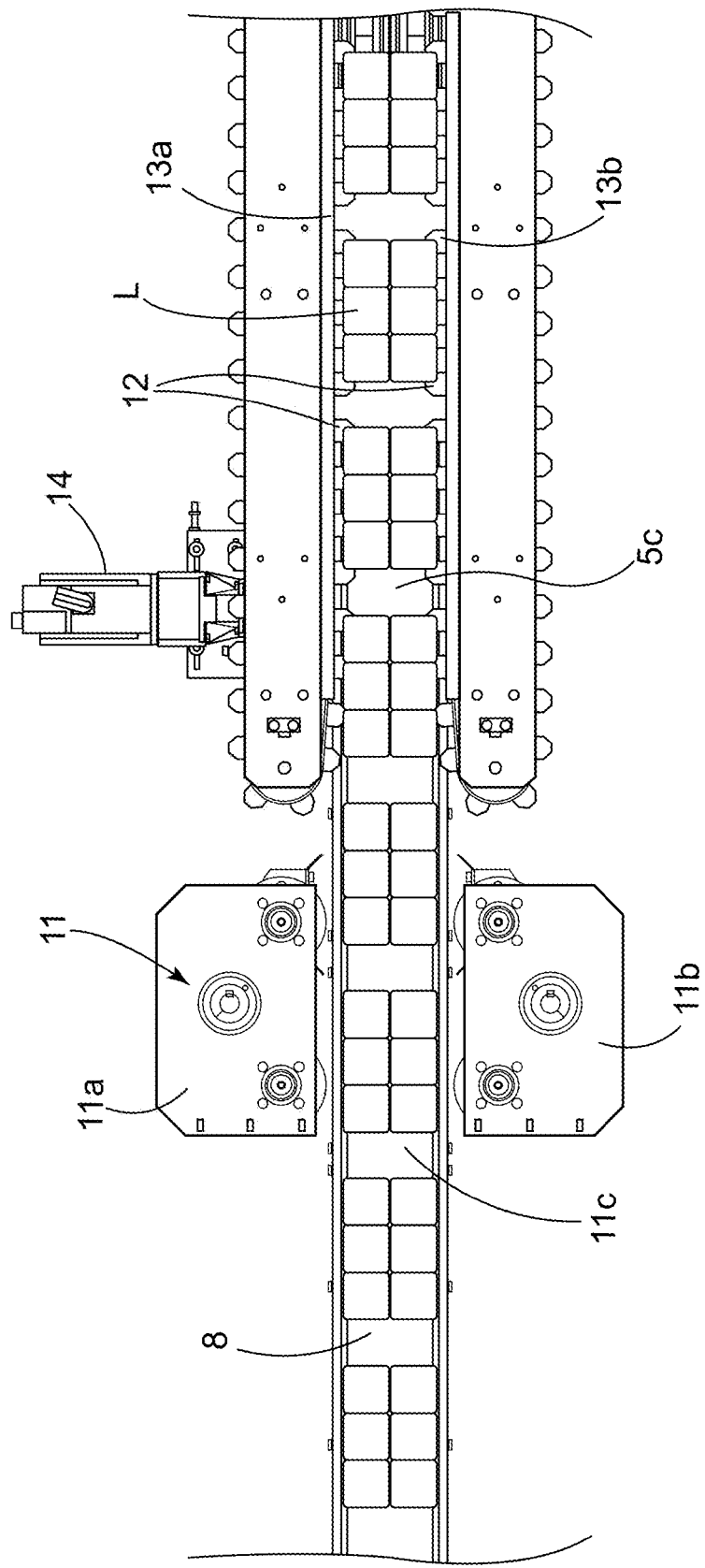
FIG. 9 is a view that is analogous to FIG. 8 in the case of lots of articles comprising six articles that are arranged 2×3, each lot of articles being separated from adjacent lots by an empty space that has the axial length of an article, this figure with the preceding illustrating the design of the machine with variable spacing.
Figure 10:
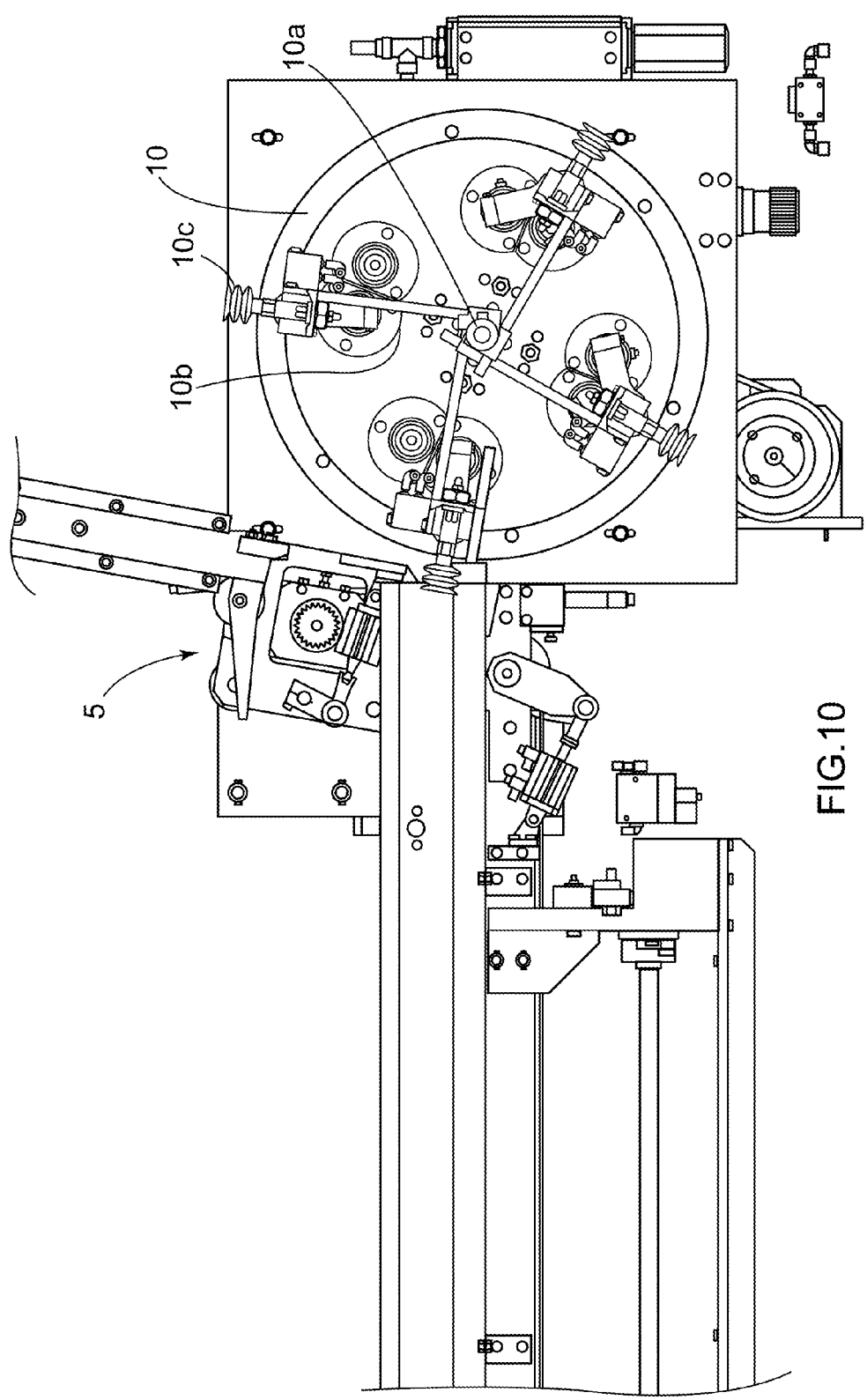
FIG. 10 is a partial elevation view of the median portion of the machine, without a blank, illustrating its unstacking means of the flat blanks.
Figure 11:
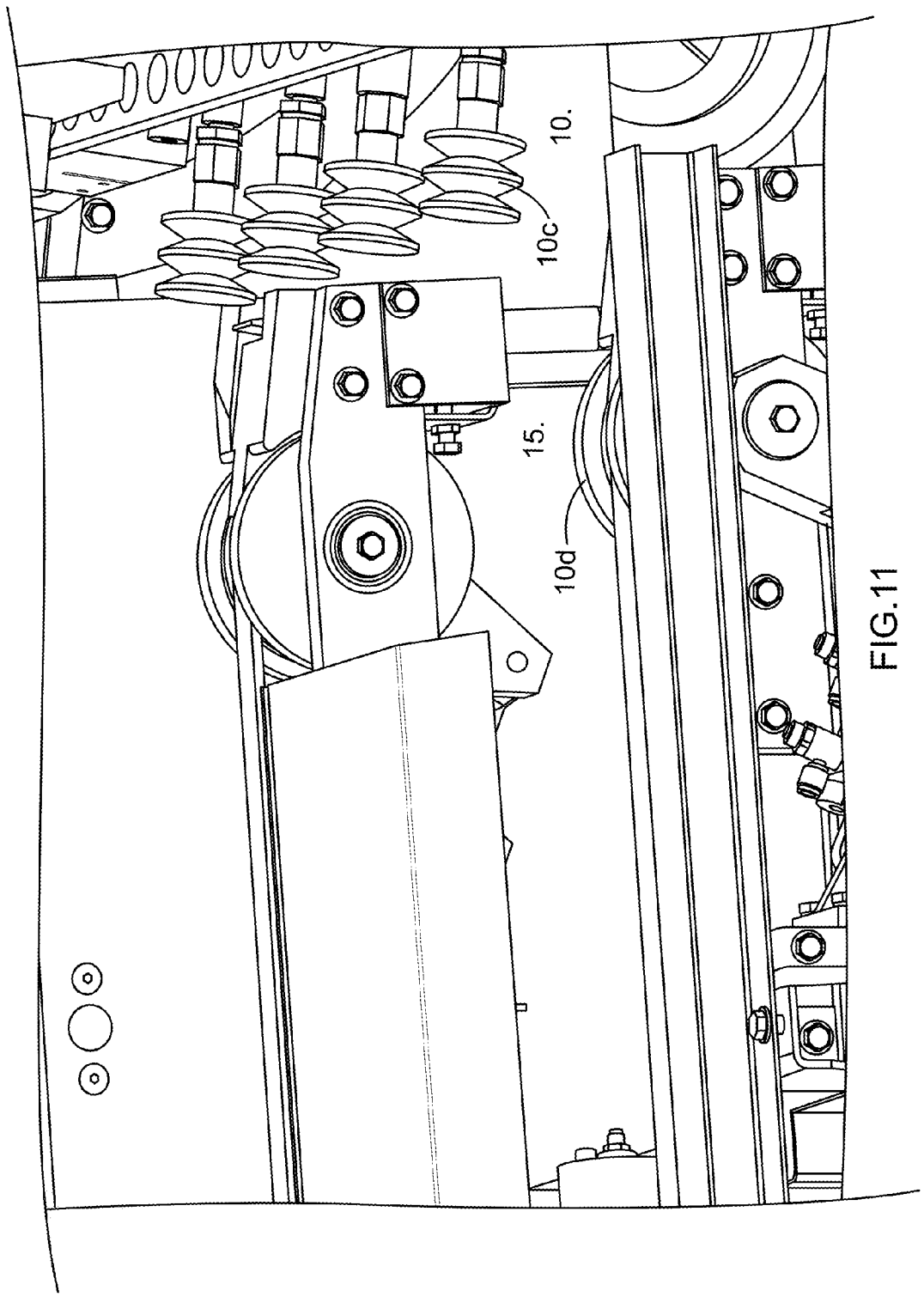
FIG. 11 is a detail perspective view and on a larger partial scale in elevation of the median portion of the machine, without a blank, illustrating its means for unstacking flat blanks and more especially its means that can separate the blank to be unstacked from the blank that follows it, comprising means for acceleration of the blank to be unstacked.
Figure 12:
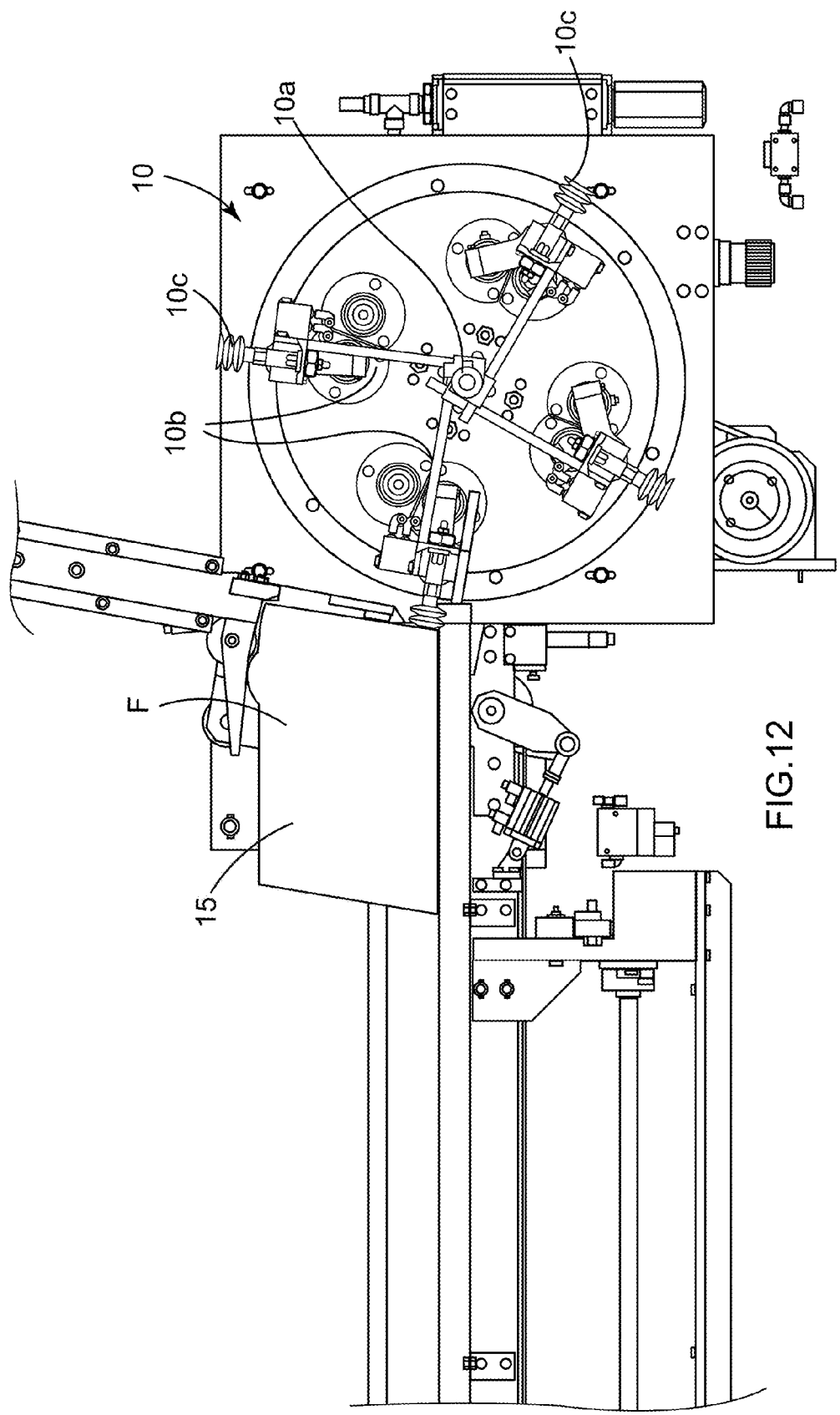
FIG. 12 is a view that is analogous to FIG. 10 of the blanks that equip the machine.
Figure 13:
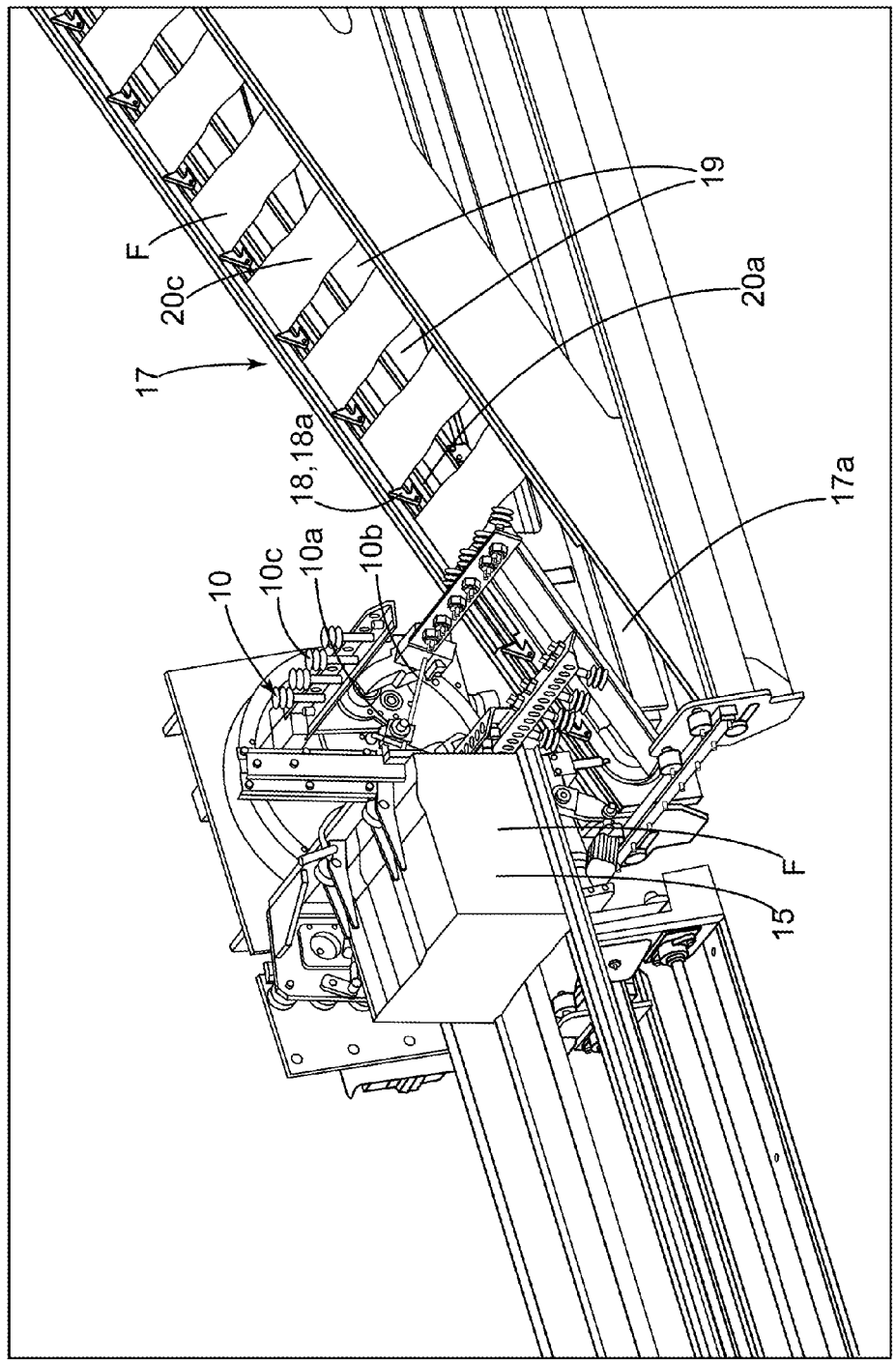
FIG. 13 is a partial top view of the median portion of the machine, with blanks, illustrating its unstacking means and its axial conveyor of an axial stream that is synchronized with flat blanks.
Figure 14:
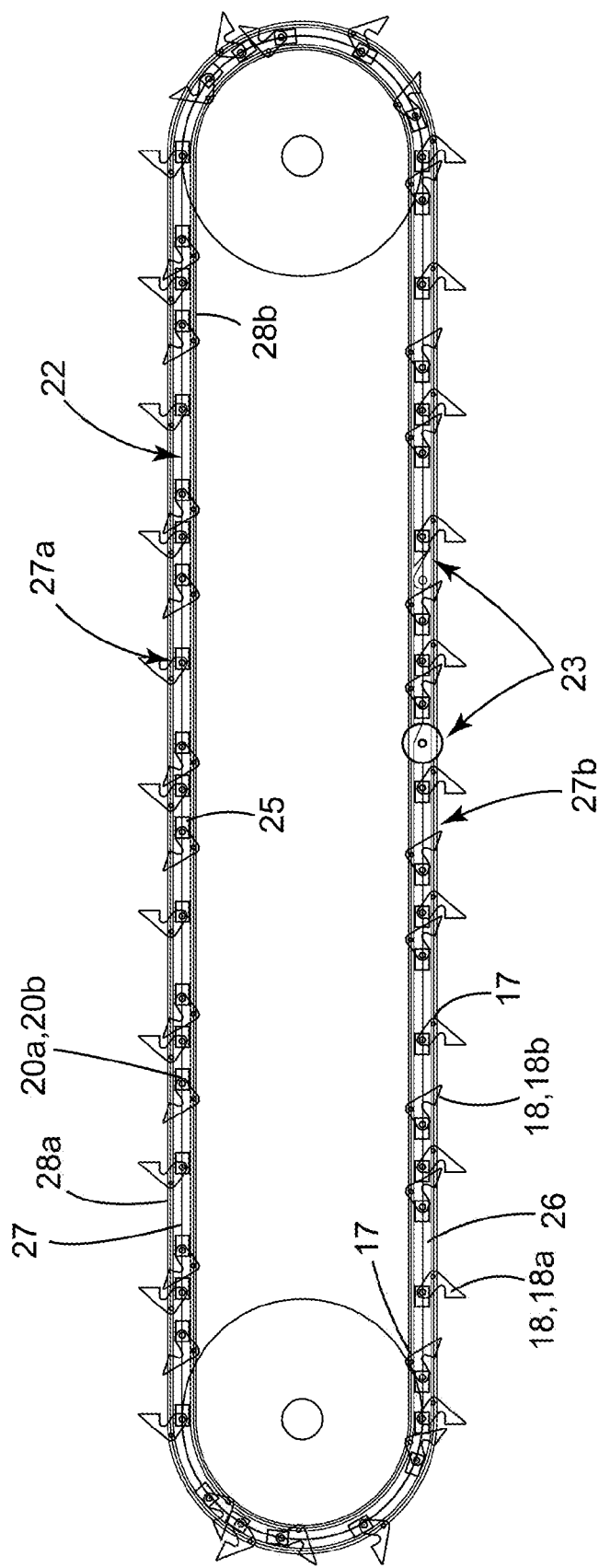
FIG. 14 is a cutaway diagram through a vertical plane that illustrates the axial conveyor of an axial stream that is synchronized with flat blanks, its pusher pins, the active routing segment for intake of the pusher pins, and the inactive routing segment for returning pusher pins where the pusher pins do not provide any push function of the flat blanks, and the guiding means and the directing means of the pusher pins.
Figure 15:
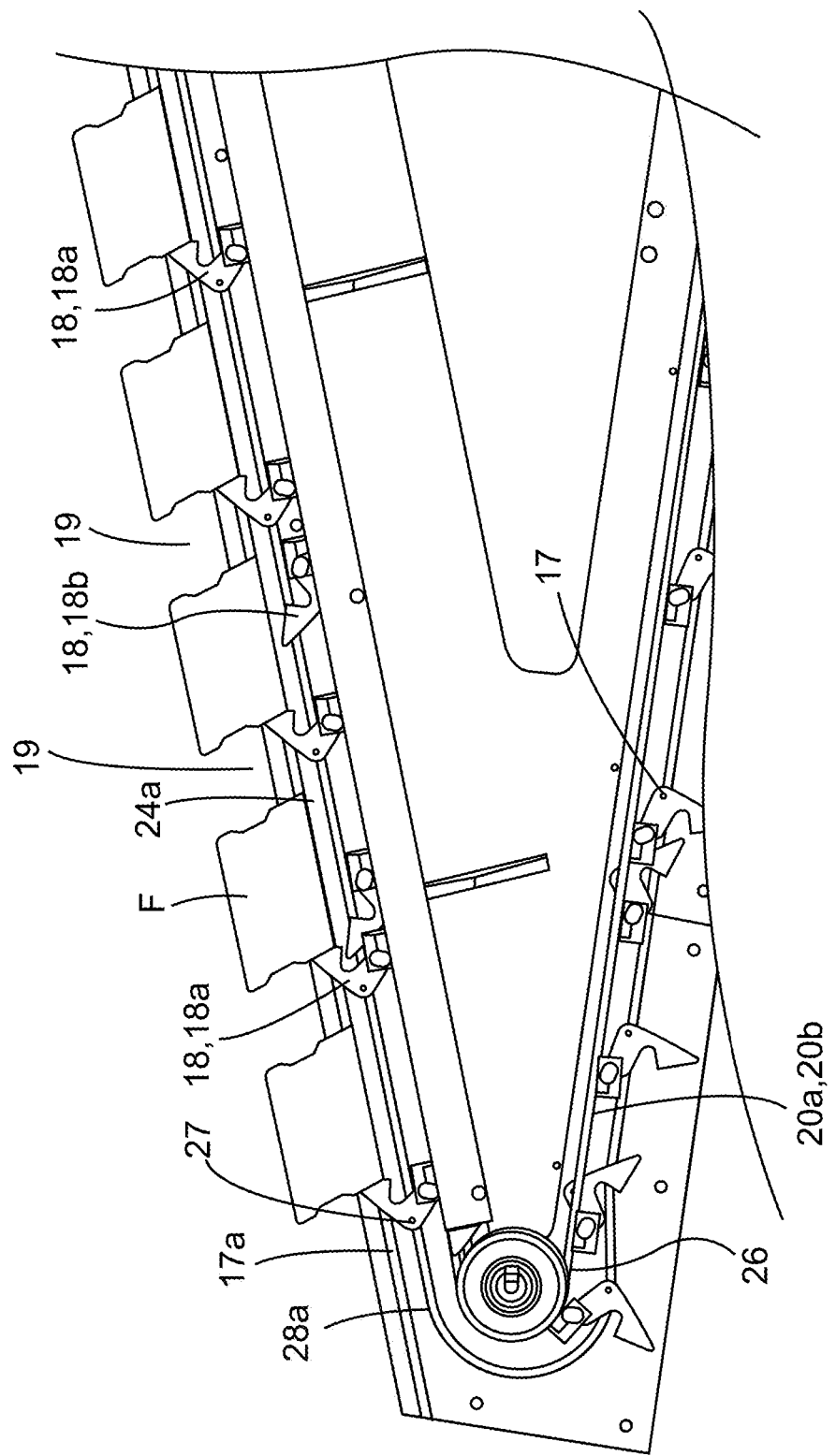
FIG. 15 is a partial perspective view on a larger scale of the conveyor of flat blanks that is equipped with blanks of a certain axial length, two successive blanks being separated by an empty space that corresponds to that with an axial length of an article of the axial conveyor of an axial stream that is synchronized with lots of articles.

It is possible that farther downstream from the conveyor means 8, the empty space 5a between two successive lots L no longer corresponds exactly to the axial length of an article A, for example because one or multiple lots L slid slightly relative to the conveyor means 8. Also, the machine comprises fine and final resetting means 11 of the synchronization of the lots L (FIGS. 7, 8 and 9). These means 11 are, for example, a dynamic device with connecting rods that is synchronized regardless of the spacing of the machine. Such a device 11 can comprise two analogous units 11a, 11b that are arranged symmetrically relative to one another by leaving between them a corridor 11c that is perpendicular to the conveyor means 8. Taking into account that the number of articles A in front of a pallet P can be variable, the spacing of the central corridor 11c and that of the units 11a and 11b can be regulated to be more or less large or small according to the requirements.

Thus, before having each lot L cooperate with each blank F, a fine and final axial resetting of the synchronization of the lots L of the axial stream that is synchronized with lots of articles is ensured.

Downstream from the fine and final resetting means 11, it is essential that the lots L be held positively for the purpose of docking below the flat blanks F.

For this purpose, it is provided that the conveyor means 8 comprise two sets of positioning and maintaining projections 12, uniformly spaced axially and driven axially and able to grasp the lots L laterally between the articles A as well as in front of the frontal article(s) A and behind the rear article(s) A of the lots L.

The two sets of projections 12 are supported by two endless belts 13a, 13b (or the equivalent) that are arranged parallel to one another and that form a conveying corridor 13c, whereby the projections 12 are arranged on the belts 13a, 13b in such a way as to be directed toward the belt 13c.

The endless belts 13a and 13b are driven by motor means 14.

The endless belts 13a, 13b are themselves supported by suitable carrying means in a movable manner with locking so as to be regulated in terms of transverse spacing; this makes it possible for them to receive varied formats of lots L, relative to the number of front articles A.

Using fine and final resetting means 11 followed by belts 13a, 13b with projections 12, a lot L of articles of the stream that is synchronized with lots L of articles is positively maintained separated from the preceding lot L and/or the following lot L by an empty space 5c that has at least the axial length of an article A or that has the axial length of a multiple of the axial length of an article A.

Thus, the axial spacing of the machine is variable and adapted to the axial length of the lot L of articles to be outer-packaged. And thus, the conveyor means 8 are adapted to the conveying of lots L of variable axial length, without the need for regulation.

Just like the device 11, the device that comprises the belts 13a, 13b with the projections 12 can provide a central corridor with spacing that can be regulated to be more or less large or small according to the requirements and the transverse length of the lots L.

As can be seen in FIGS. 8 and 9, when the outer packaging of lots L is initiated with different axial lengths—two articles A in the case of FIG. 8b and three articles A in the case of FIG. 9—the adjacent lots are always separated by an empty space 5c, which is the smallest space possible in the axial direction, since it corresponds to the axial length of an article A.

Reference is now made more especially to FIGS. 10 to 18 relative to the stream of blanks F.

The machine comprises a storage unit 15 of stacked flat blanks F, located in the lower portion, laterally and beyond the downstream end 3c of the conveyor means 3 and therefore downstream from the robots 7, 7a, 7b.

In the storage unit 15, the blanks F are stacked in such a way that the first blank F that is to be used and therefore to be unstacked is arranged slightly inclined vertically, carried by the support elements of the storage unit 15, toward the output of the storage unit 15.

Downstream from the storage unit 15, there are means 10 for unstacking flat blanks F one by one, one after the other.

In the embodiment that is shown, the unstacking means 10 are in the form of an unstacking wheel that is mounted to rotate around a transverse axis 10a, supporting a multiple of—here, four—radial arms 10b that are terminated by suction cups 10c. Motor means 16 drive the unstacking wheel 10. With such means, the suction cups 10c of the arms 10b that come successively to the outlet of the storage unit 15 can grasp and then move as the first blanks F come to the outlet of the storage unit 15. Of course, this embodiment of the unstacking means is only by way of example and is in no way limiting.

The thus unstacked blanks F are deposited after a rotation of approximately 120° in the lower upstream portion 17a of the axial conveyor means 17 of an axial stream that is synchronized with flat blanks F.

The unstacking means 10 are controlled based on requirements, which is made possible by the fact that they are placed downstream from the robots 7, 7a, 7b.

As has already been indicated, each spacing of the axial stream that is synchronized with lots of articles produced by the robots 7, 7a 7b is controlled.

If the spacing (of the stream of lots L of articles) comprises a lot of articles L, the unstacking of a flat blank F is controlled, i.e., the operation of the unstacking means 10 is controlled.

If, on the contrary, the spacing does not comprise the lot L, the unstacking of a flat blank is not controlled, i.e., the operation of the unstacking means 10 is not controlled.

Consequently, an axial stream that is synchronized with lots of articles and the axial stream that is synchronized with flat blanks are correspondingly composed in such a way that a spacing that comprises a flat blank F corresponds to a spacing that comprises a lot L of articles and a spacing that does not comprise a flat blank F corresponds to a spacing that does not comprise a lot L of articles.

In an advantageous embodiment (FIG. 11), it is provided that the unstacking means 10 comprise means 10d that can separate the blank F to be unstacked from the blank F that follows it. These means 10d comprise means for acceleration of the blank F that is to be unstacked. For example, the axial routing of the blank is increased, whereas its axial linear speed is the same. To do this, it is provided that the blank F that is to be unstacked passes through a projection 10c.

The conveyor means 17 are arranged inclined from the bottom to the top and from upstream to downstream, at least partially perpendicular under the conveyor means 8. The upstream end portion 17a of the conveyor means 17 is located immediately in the low position downstream from the unstacking means. The downstream end portion 17b of the conveyor means 17 reaches below the conveyor means 8.

The conveyor means 17 comprise pusher pins 18 for positioning and maintaining uniform axial spacing that can be retracted so that a blank F of the stream that is synchronized with flat blanks is positively maintained separated from the preceding blank F and/or the following blank F by an axial empty space 19 that has at least the axial length of an article A or that has the axial length of a multiple of the axial length of an article A.

Thus and as for the lots L of articles A, the machine also has, for the blanks F, variable spacing that is adapted to the length of the lot L.

As for the lots L, the conveyor means 17 are adapted to the conveying of blanks F with variable axial length, without the need for regulation.

As for the lots L, the conveyor means 17 can be regulated in terms of transverse spacing, consequently being adapted to the conveying of flat blanks with variable transverse length.

In the embodiment that is shown, the conveyor means 17 comprise two endless driving belts 20a, 20b that are driven by motor means 21.

The belts 20a, 20b are arranged parallel and transversely to one another and are spaced for forming an axial conveying corridor 20c.

The belts 20a, 20b supporting the pusher pins 18.

Figure 16:
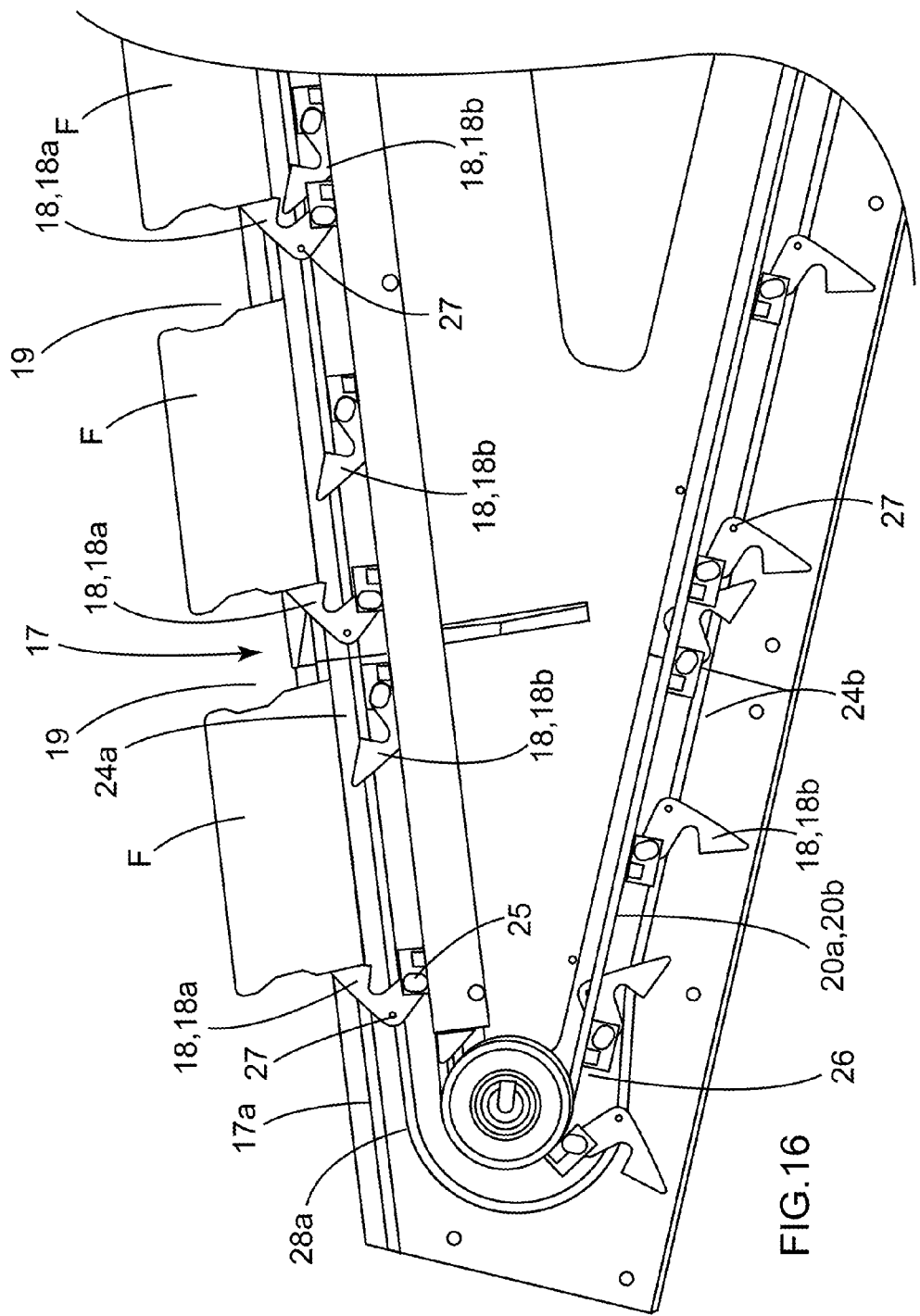
FIG. 16 is a view that is analogous to FIG. 15, under another angle, in the case of flat blanks of another axial length, whereby two successive blanks are separated by the same empty space.
Figure 17:
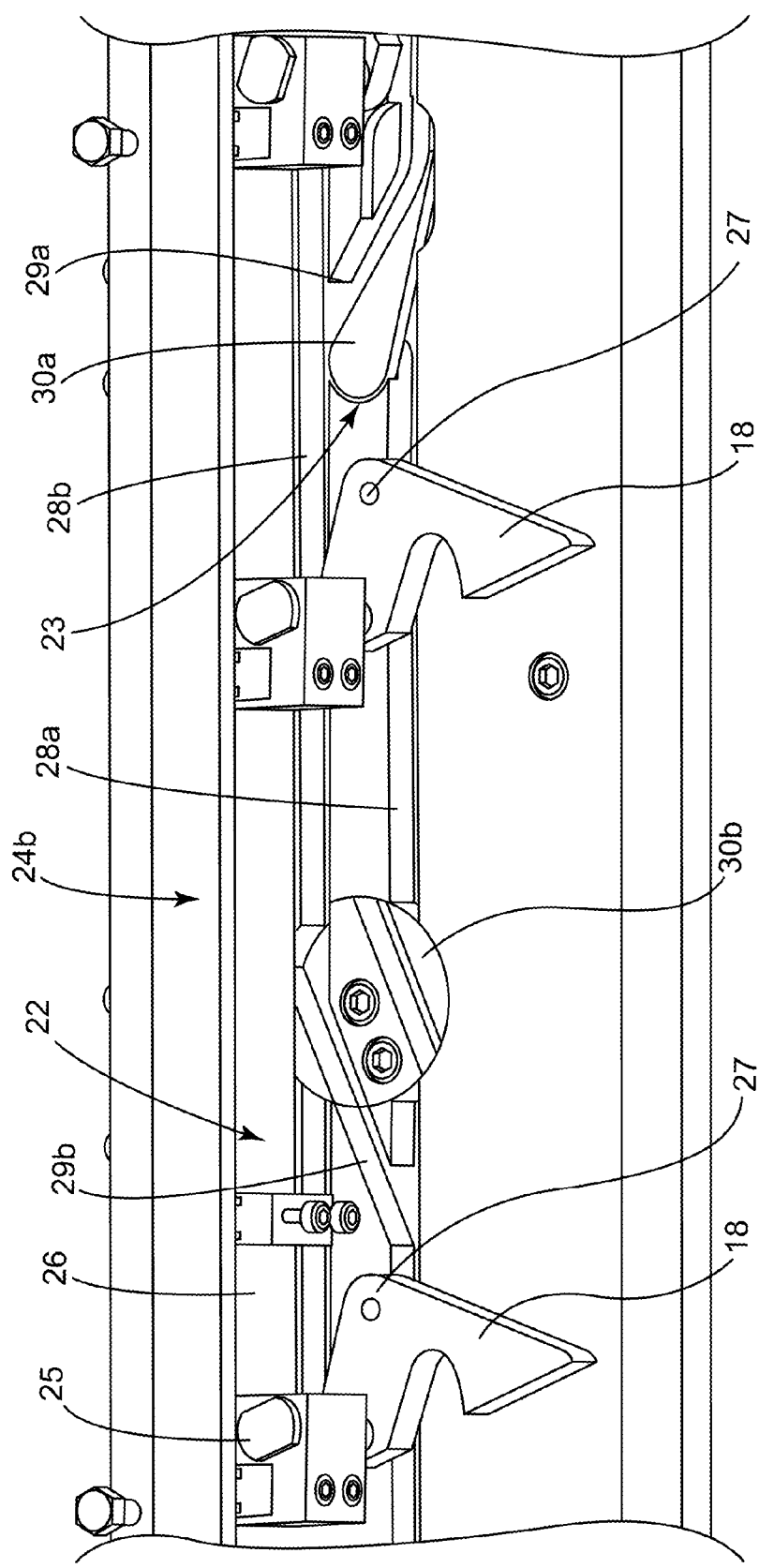
FIG. 17 and FIG. 18 are two partial perspective views that illustrate two different configurations of the movable orientation parts for guiding the stud of the pusher pins.
Figure 18:
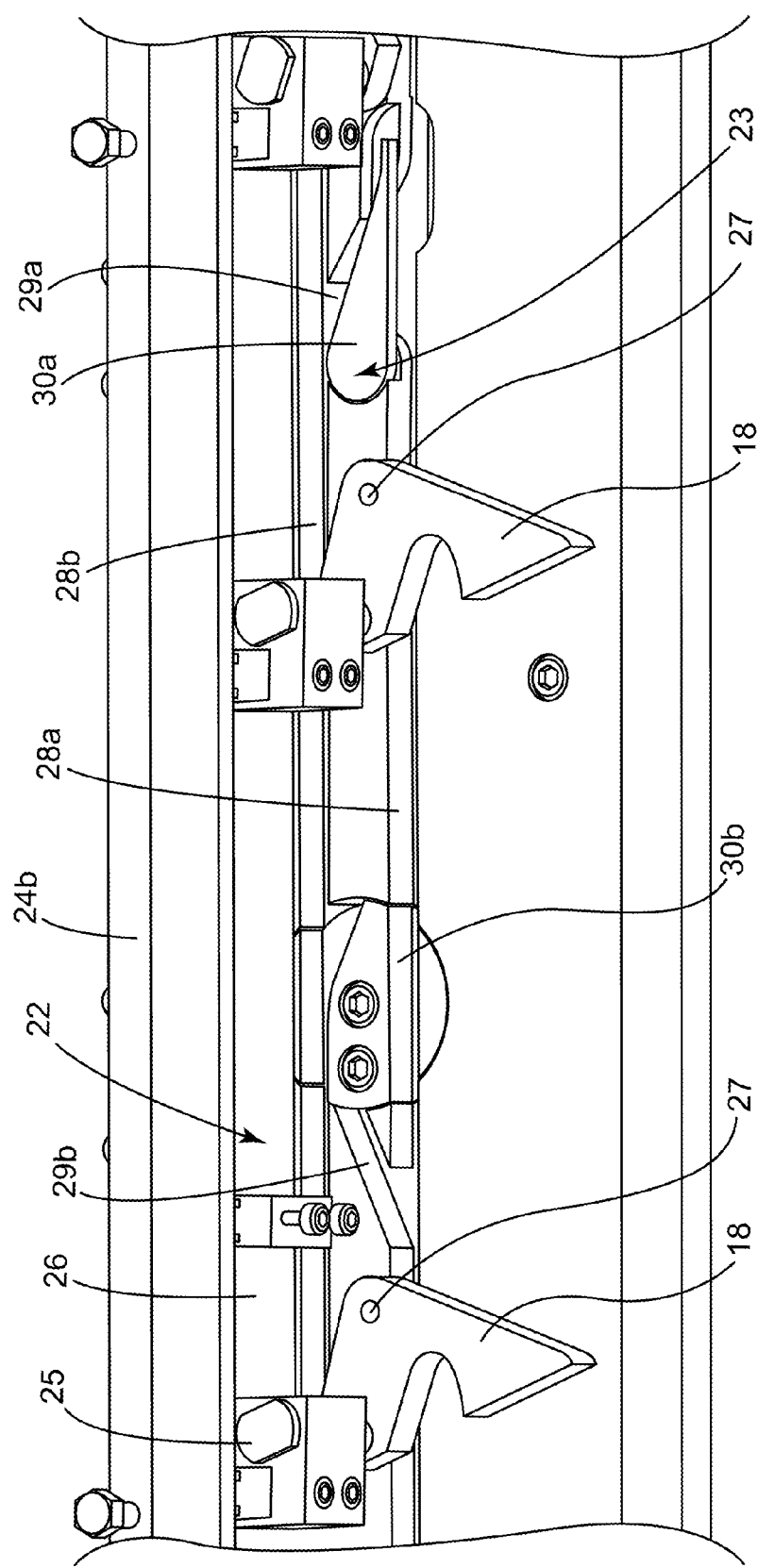
Figure 19:
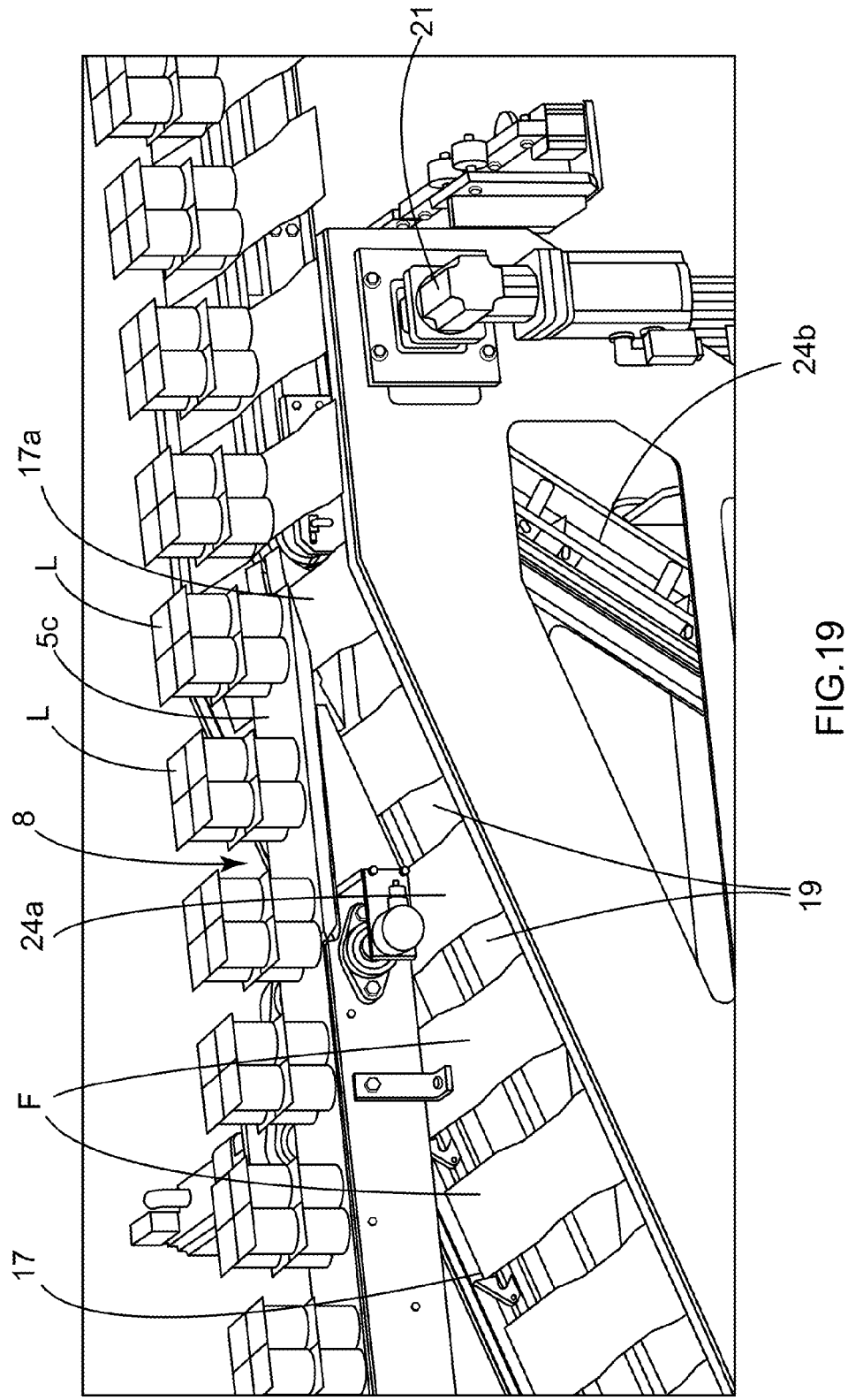
FIG. 19 is a partial top perspective view of the median portion of the machine, illustrating the docking of the flat blanks under the lots of articles.

The pusher pins 18 are movable and can be locked in relative position in such a way as to each be separately in an active projecting situation (pins 18a for example in FIG. 16) or in an inactive retracted situation (pin 18b for example in FIG. 16).

The conveyor means 17 also comprise successive guiding means 22 and directing means 23 of the pusher pins 18. Thus, the pins 18 are brought either into the active projecting situation or into the inactive retracted situation.

The configuration of the succession of pins 18 in the situations in question corresponds to the required configuration for driving the successive blanks F of the axial stream that is synchronized with the blanks in exact correspondence with the axial stream that is synchronized with lots L of articles. This means that:

For each lot L, a blank F is brought in,

In the hypothesis where for a given spacing of the stream of lots L, there is no lot L, there will no longer be a blank F in the stream of blanks, The successive arrangement of the lots L and the successive arrangement of the blanks F is strictly identical, And, finally, at the location where the conveyor means 8 and the conveyor means 17 meet (downstream end 17b), a lot L is placed exactly above, centered perpendicular to the blank F.

The conveyor means 17, more specifically the belts 20a, 20b, comprise an active routing segment 24a for intake of the pins 18, where the latter provide their push function of the flat blanks F and an inactive routing segment 24b for returning pins 18, where the latter do not provide any push function of the flat blanks F. The guiding means 22 and the directing means 23 of the pusher pins 18 are found on the inactive routing segment 24b. Since this results from the preceding explanations, only a portion of the pins 18 that are on the active routing segment 24a are in the active situation, and another portion is in the inactive situation based on the format of the desired lots L.

According to one embodiment, a pusher pin 18 is carried by an axial driving part 25. The axial driving part 25 is itself carried by an endless belt 20a, 20b. The driving part 25 is able to work with axial sliding with an axial guiding slide 26.

Furthermore, the pusher pin 18 is mounted on the driving part 25 in a way that is articulated around a transverse axis 18c in such a way as to be able to pivot relative to the part 25 over a course that has two end-of-travel positions that define respectively the two active projecting and inactive retracted situations.

The pusher pin 18 also laterally comprises a control stud 27 that is directed transversely and separated from the pivoting axis 18c.

A control stud 27 works with one of the two axial guiding slides of stud 28a, 28b. These slides 28a, 28b are arranged parallel to one another and to the guiding slide 26 of the driving part 25.

The control stud 27, when it is in the guiding slide 28a, is in the active projecting situation. When it is in the guiding slide 28b, it is in the inactive retracted situation.

The directing means 23 comprise two guiding bypasses 29a, 29b that are spaced axially from one another and that connect the two guiding slides 28a, 28b. They also comprise two movable orientation parts 30a, 30b, combined with two bypasses 29a, 29b. These orientation parts 30a, 30b are controlled in a suitable manner to control the guiding of the stud 27 so that it is in the guiding slide 28a, 28b where it was, or, on the contrary, so that it is oriented toward the other slide 28b, 28a.

The machine also comprises means for cooperation of each lot L composed with each flat blank F, whereby the blank F comes below the lot L.

Downstream, the machine comprises means for folding the blank F around the lot L of articles and for making a single unit of it.

Finally, downstream, the machine comprises means for axial evacuation of the axial stream that exits from the outer-packaged lots of articles.

The invention claimed is:

1. A process for outer packaging, in a dynamic way, of lots (L) of articles (A) in an outer-packaging blank (F), the articles (A) being arranged on pallets (P), the articles (A) being of a same length in a direction of travel, plural of the articles (A) being arranged on each of the pallets (P) in at least one column or in at least one line on each pallet (P), each lot (L) of the articles (A) comprising at least one layer of the pallets (P), the method comprising the steps of:
    A) starting from a random incoming axial stream of the pallets (P) moving in the direction of travel, with the articles (A) each having the same length in the direction of travel, and with the articles (A) arranged on each of pallets (P) in the at least one column or in the at least one line, composing the pallets (P) into the lots (L) of the articles (A) ;
    B) starting from a stack of the outer-packaging blanks (F) arranged flat, successively unstacking the outer-packaging blanks (F) as flat unstacked individual outer-packaging blanks (F);
    C) putting together each lot (L) of the articles (A) with a corresponding individual outer-packaging blank (F), and then folding the corresponding individual outer-packaging blank (F) around each lot (L) of the articles (A) and make each lot (L) of the articles (A) and the corresponding individual outer-packaging blank (F) into a single unit of outer-packaged lots (L) of the articles (A);
    D) evacuating an exiting axial stream of the units of the outer-packaged lots (L) of the articles (A),
    wherein based on a desired format of the outer-packaged lots (L) of the articles (A), each of the units of the outer-packaged lots (L) of the articles (A) comprises a number of the articles (A) per pallet, an arrangement of the articles (A) on each pallet, and a selected number of pallets (P), stacked one pallet (P) on another pallet (P),
    wherein said step A) of composing the pallets (P) into the lots (L) of the articles (A) comprises the sub-steps of
    i) regulating and synchronizing the pallets (P) of the articles (A) of the random incoming axial stream to a spacing of a machine to form a synchronized axial stream of the pallets (P) of the articles (A),
    ii) transferring all of the pallets (P) of the articles (A) from the synchronized axial stream to constitute another synchronized axial stream of the lots (L) of the articles (A) according to the desired format of the outer-packaged lots (L) of the articles (A) and an operating rate, and
    iii) within the other synchronized axial stream of the lots (L) of the articles (A), providing first empty axial spaces (5a, 5c) that have an axial length of one of the articles (A) or a multiple of the axial length of the one article (A) between each of the lots (L) of the articles (A) so that each lot (L) of the articles (A) of the other synchronized axial stream is thus separated axially from a preceding lot (L) of the articles (A) and a following lot (L) of the articles (A) by one of the first empty axial spaces (5a, 5c), whereby the axial spacing of the machine is variable and adapted to an axial length of the lot (L) of the articles (A),
    wherein said step B) of unstacking the outer-packaging blanks (F) as flat unstacked individual outer-packaging blanks (F) comprises a sub-step iv) of unstacking the flat outer-packaging blanks (F) upon demand based on the pallets (P) of the articles (A) that are thus transferred in constituting the other synchronized axial stream, with the unstacked individual outer-packaging blanks (F) forming a further synchronized axial stream of the unstacked individual outer-packaging blanks (F) corresponding exactly to the other synchronized axial stream of the lots (L) of the articles (A) such that each unstacked individual outer-packaging blank (F) is thus separated from a preceding unstacked individual outer-packaging blank (F) and from a following unstacked individual outer-packaging blank (F) by a second empty axial space (19) that has the axial length of the article (A) or the multiple of the axial length of the article (A), and
    wherein said step C) of putting together comprises i) starting from the other synchronized axial stream of the lots (L) of the articles (A) and ii) starting with the further synchronized axial stream of the unstacked individual outer-packaging blanks (F), putting together each lot (L) of the articles (A) other synchronized axial stream with the corresponding individual outer-packaging blank (F) from the further synchronized axial stream of the unstacked individual outer-packaging blanks (F) to form each single unit of the outer-packaged lots (L) of the articles (A).

2. The process according to claim 1, further comprising, prior to said step C) of putting together, a further step of a fine and final axial resetting of the pallets (P) of the articles (A) in the other synchronized axial stream of the lots (L) of the articles (A) is performed.

3. The process according to claim 1, wherein in said step A) of composing the pallets (P), each the pallets (P) of the articles (A) of the synchronized axial stream is transferred from the synchronized axial stream of the pallets (P) of the articles (A) to the other synchronized axial stream of the lots (L) of the articles (A) according to the desired format and the operating rate, by a manipulation of robotized grasping.

4. The process according to claim 1, wherein the manipulation of robotized grasping grasps plural pallets (P) simultaneously from the synchronized axial stream and transfers the grasped plural pallets (P) from the synchronized axial stream of the pallets (P) of the articles (A) to the other synchronized axial stream of the lots (L) of the articles (A).

5. The process according to claim 1, comprising the further steps of:
    in step A) of composing the pallets (P) into the lots (L), controlling the spacing between the lots (L) of the articles (A) in the other synchronized axial stream of the pallets (P) of the articles (A), upon determining that a region of the other synchronized axial stream of the lots (L) of the articles (A) comprises one lot (L) of the articles (A), controlling the unstacking of the outer-packaging blanks (F) upon determining that the region of the other synchronized axial stream of the lots (L) of the articles (A) does not comprise one lot (L) of the articles (A), not controlling the unstacking of the outer-packaging blanks (F), and controlling the other synchronized axial stream of the lots (L) of the articles (A) and the further axial stream of the unstacked individual outer-packaging blanks (F) to cooperate in such a way that i) a first spacing that comprises a specific flat blank (F) corresponds to a second spacing that comprises a specific lot (L) of the articles (A), and ii) a third spacing that does not comprise any flat blank (F) corresponds to a fourth spacing that does not comprise any lot (L) of the articles (A).

6. The process according to claim 1, wherein,
in said sub-step iv) each unstacked individual outer-packaging blank (F) is pushed from the further synchronized axial stream by driving pusher pins (18) that have uniform axial spacing and that are arranged to be either in an active projecting situation or in an inactive retracted situation,
the successive pusher pins (18) are guided and directed to be in the active projecting situation or in the inactive retracted situation corresponding to a configuration that is required for driving the unstacked individual outer-packaging blanks (F) of the further synchronized axial stream in correspondence with the another synchronized axial stream of the lots (L) of the articles (A).

7. The process according to claim 6, wherein regulating spacing of the further synchronized axial stream comprises:
directing in an inactive routing segment (24b) for returning pusher pins (18) where the pusher pins (18) do not provide any push function of the flat blanks (F), the successive pusher pins (18) to bring them into the active projecting situation or into the inactive retracted situation in such a way as to define a configuration of successive pusher pins (18) corresponding to a required configuration for driving the successive flat blanks (F) of the axial stream that is synchronized with flat blanks (F) in correspondence with the axial stream that is synchronized with lots (L) of articles (A), and
guiding in movement, one the thus directed pusher pins (18) are brought into the active projecting situation or into the inactive retracted situation that is required, the pusher pins (18) by maintaining their active projecting situation or inactive retracted situation, including in an active routing segment (24a) for intake of pusher pins (18) where the pusher pins (18) provide their push function of the flat blanks (F).

8. The process according to claim 6, wherein, without regulating the spacing of the further synchronized axial stream, guiding in movement the pusher pins (18) by maintaining their active projecting situation or their inactive retracted situation corresponding to a required configuration to drive the successive flat blanks (F) of the further synchronized axial stream in correspondence with the other axial stream of the lots (L) of the articles (A), in an inactive routing segment for returning (24b) pusher pins (18) where the pusher pins (18) do not provide any push function of the flat blanks (F) and in an active routing segment for intake (24a) of pusher pins (18) where the pusher pins (18) provide their push function of the flat blanks (F).

9. The process according to claim 1, wherein, during the unstacking of the blanks (F), separating one of the blanks (F) that is currently being unstacked from a following blank (F) by accelerating the blank (F) that is currently being unstacked.

10. An outer-packaging machine for implementation of the process according to claim 1 of outer packaging of the lots (L) of the articles (A) in the outer-packaging blanks (F), the machine comprising:
upstream axial intake means (1) of said incoming random axial stream of pallets (P) of articles (A),
upstream means (8) for constituting the lots (L) of articles,
upstream means for forming a stack of the flat, outer-packaging blanks (F, 15), and
means (10) for unstacking the flat, outer-packaging blanks (F) successively,
downstream means for constituting the lots (L) of the articles (A),
means of cooperation of each lot (L) of the articles (A) constituted with each unstacked flat, outer-packaging blank (F), and, downstream, means for folding the blank (F) around the lot of the articles (A) and for making each lot (L) of the articles (A) and the corresponding individual outer-packaging blank (F) into the single units of outer-packaged lots (L) of the articles (A); and
downstream means for axial evacuation of the exiting axial stream of the units of the outer-packaged lots (L) of the articles (A),
said means being comprised by:
upstream means (2) for regulating and means for synchronizing the pallets (P) of the articles (A) of the random incoming axial stream to the spacing of the machine, followed by axial conveying means of the synchronized axial stream of the pallets (P) of the articles (A),
means (7) for transferring all of the pallets (P) of the articles (A) from the axial conveying means of the synchronized axial stream to the axial conveying means (8) of the other synchronized axial stream of the lots (L) of the articles (A) according to the desired format and the operating rate,
means (10) for unstacking the flat blanks (F) upon demand that are responsive to the means (7) for transferring all the pallets (P) of the articles, followed by axial conveyor means of further synchronized axial stream (17) of the unstacked flat blanks (F) in correspondence with the axial conveyor means (8) of the other synchronized axial stream of the lots (L) of the articles (A), and
downstream axial conveyor means (8) of the other synchronized axial stream of the lots (L) of the articles (A) and axial conveyor means (17) of the further synchronized axial stream of the unstacked flat blanks (F), means for cooperation successively from each lot of the articles (A) with each flat blank (F), and, downstream, means for folding the blanks (F) around each lot of articles (A) when making each lot (L) of the articles (A) and the corresponding individual outer-packaging blank (F) into the single unit of outer-packaged lots (L) of the articles (A).

11. The outer-packaging machine according to claim 10, wherein the axial conveyor means (8) of the other synchronized axial stream of the lots (L) of the articles (A) comprises projections (12) for positioning and maintaining uniform axial spacing so that a lot of articles (A) of the stream that is synchronized with lots (L) of articles (A) is positively maintained separated from the preceding lot of articles (A) and/or the following lot of articles (A) by an empty axial space (5c) that has at least the axial length of an article (A) or that has the axial length of a multiple of the axial length of an article (A), the axial spacing of the machine thus being variable and adapted to the length of the lot of articles, the axial conveyor means of the other synchronized axial stream of the lots (L) of the articles (A) being adapted to the conveying of the lots (L) of the articles (A) with a variable axial length, without the need for regulation.

12. The outer-packaging machine according to claim 10, wherein the axial conveyor means (8) of the other synchronized axial stream of the lots (L) of the articles (A) can be regulated in terms of transverse spacing, whereby the axial conveyor means (8) of the other synchronized axial stream of the lots (L) of the articles (A) is suitable for conveying the lots (L) of the articles (A) with a variable transverse length.

13. The outer-packaging machine according to claim 10, wherein the axial conveyor means (17) of further synchronized axial stream of the unstacked individual outer-packaging blanks (F) comprise pusher pins (18) for positioning and maintaining uniform axial spacing that is retractable so that a flat blank (F) of the stream that is synchronized with a flat blank (F) is positively maintained separated from the preceding flat blank (F) and/or the following flat blank (F) by an empty axial space (19) that has at least the axial length of an article (A) or that has the axial length of a multiple of the axial length of an article (A), whereby the axial spacing of the machine thus is variable and is adapted to the length of the lot (L) of articles (A), with the axial conveyor means (17) of further synchronized axial stream of the unstacked individual outer-packaging blanks (F) being adapted to the conveying of blanks (F) of variable axial length, without the need for regulation.

14. The outer-packaging machine according to claim 13, wherein the axial conveyor means (17) of the further synchronized axial stream of the unstacked flat blanks (F) come in a form of two endless driving belts (20a, 29b), arranged parallel to one another by forming a conveying corridor (20c), supporting pusher pins (18) for positioning and driving that are uniformly axially spaced, arranged to move and that can be locked in position in such a way as to each be separately either in an active projecting situation or in an inactive retracted situation, and comprise means (22) for guiding and means (23) for directing successive pusher pins (18) that are capable in that they are in the active projecting situation or in the inactive retracted situation corresponding to a configuration that is required for driving the successive flat blanks (F) of the axial stream that is synchronized with flat blanks (F) in correspondence with the other synchronized axial stream of the lots (L) of the articles (A).

15. The outer-packaging machine according to claim 14, wherein the axial conveyor means (17) of the further synchronized axial stream of the unstacked flat blanks (F) comprise an active routing segment (24a) for intake of pusher pins (18) where the pusher pins (18) provide their push function of the flat blanks (F) and an inactive routing segment (24b) for returning pusher pins (18) where the pusher pins (18) do not provide any push function of the flat blanks (F), a segment on which there are means (22) for guiding and means (23) for directing of the pusher pins (18).

16. The outer-packaging machine according to claim 14, wherein a pusher pin (18) is carried by an axial driving part (25) that is carried by an endless belt (20a, 20b), whereby the axial driving part (25) is able to work with axial sliding with an axial guiding slide (26), the pusher pin (18) being mounted on the axial driving part (25) in an articulated way around a transverse axis (18c) to be able to pivot in a relative way over a course that has two end-of-travel positions that define the two active projecting and inactive retracted situations, whereby the pusher pin (18) laterally comprises a control stud (27) that is directed transversally and that is separated from the pivoting axis (18c), working with one of the two axial guiding slides of the stud (28a, 28b), arranged parallel to one another and to the axial guiding slide (26) of the driving part (25), whereby the stud (27) is in one of the two axial guiding slides of the stud (28a) in the active projecting situation and is in the other (28b) of the two axial guiding slides of the stud (28a, 28b) in the inactive retracted situation.

17. The outer-packaging machine according to claim 16, wherein the directing means (23) comprise a guiding bypass (29a, 29b) that connects the two axial guiding slides of the stud (28a, 28b) and a controlled, movable orientation part (30a, 30b) that can control the guiding of the stud (27) so that it is in the axial guiding slide of the stud (28a, 28b) where it was found or it is oriented toward the other axial guiding slides of the stud (28b, 28a).

18. The outer-packaging machine according to claim 10, wherein the axial conveyor means (17) further synchronized axial stream of the unstacked individual outer-packaging blanks (F) can be regulated in terms of transverse spacing, the axial conveyor means (17) of further synchronized axial stream of the unstacked individual outer-packaging blanks (F) being adapted to the conveying of flat blanks (F) with a variable transverse length.

19. The outer-packaging machine according to claim 10, wherein upstream from the means of cooperation of each lot of the articles (A) of the other synchronized axial stream of the lots (L) of the articles (A) with each flat blank (F) of the further synchronized axial stream further comprising means (11) for fine and final resetting of the synchronization of the pallets (P) of the articles (A) of the synchronized axial stream of the pallets (P) of the articles (A).

20. The outer-packaging machine according to claim 10, wherein the means (7) for transfer of all of the pallets (P) of articles (A) from the axial conveyor means of the synchronized axial stream of the pallets (P) of the articles (A) to the axial conveyor means of the other synchronized axial stream of the lots (L) of the articles (A), according to the desired format and operating rate, comprise one or multiple robots (7a, 7b) for manipulation of grasping.

21. The outer-packaging machine according to claim 10, wherein the means (7) for transfer of all of the pallets (P) of the articles (A) from the axial conveyor means of the synchronized axial stream of the pallets (P) of the articles (A) to the axial conveyor means (8) of the other synchronized axial stream of the lots (L) of the articles (A), according to the desired format and operating rate, comprise means (7) for manipulation of grasping of a single pallet (P) at a same time or multiple pallets (P) simultaneously.

22. The outer-packaging machine according to claim 10, further comprising means for controlling each spacing of the axial conveyor means (8) of the other synchronized axial stream of the lots (L) of the articles (A) to detect the presence or the absence of a lot of articles (A) and means for controlling means (10) for unstacking that are responsive to these control means.

23. The outer-packaging machine according to claim 10, wherein the means (2) for regulation and the means for synchronization to the spacing of the machine of the pallets (P) of articles (A) of the incoming stream comprise an upstream portion (3a) of the axial conveyor means (3) of the synchronized axial stream of the pallets (P) of the articles (A) with which are combined retractable locking elements (4) downstream from the pallets (P) of the articles (A) that move axially at a lower speed than that of the axial conveyor means of the synchronized axial stream of the pallets (P) of the articles (A).

24. The outer-packaging machine according to claim 10, wherein the downstream portion of the axial conveyor means of the synchronized axial stream of the pallets (P) of the articles (A) has an adequate length such that all of the pallets (P) that they receive can be transferred by the transfer means (7) to the axial conveyor means (8) of the synchronized axial stream of the pallets (P) of the articles (A).

25. The outer-packaging machine according to claim 10, wherein the axial conveyor means (3) of the synchronized axial stream of the pallets (P) of the articles (A) and the axial conveyor means (8) of the other synchronized axial stream of the lots (L) of the articles (A) are arranged side by side.

26. The outer-packaging machine according to claim 10, wherein the axial conveyor means (2) of the synchronized axial stream of the pallets (P) of the articles (A) have a transverse width that can receive a multiple of pallets (P) of articles (A).

27. The outer-packaging machine according to claim 10, wherein the axial conveyor means (8) of the other synchronized axial stream of the lots (L) of the articles (A) have a transverse width that can receive a single pallet (P) of articles (A).

28. The outer-packaging machine according to claim 11, wherein the axial conveyor means (8) of the other synchronized axial stream of the lots (L) of the articles (A) come in a form of two endless belts (13a, 13b) that are arranged parallel to one another and that form a conveying corridor (13c), supporting projections (12) for positioning and maintaining uniform axial spacing, arranged to be directed toward the corridor (13c), whereby the two belts (13a, 13b) are carried by carrying means in a movable manner with locking that can be regulated in terms of transverse spacing.

29. The outer-packaging machine according to claim 10, wherein the unstacking means (10) comprise means (10d) that can separate the blank (F) that is to be unstacked from the following blank (F) that comprises means of acceleration of the blank (F) that is to be unstacked.

\* \* \* \* \*